(12) United States Patent
Menashe et al.

(10) Patent No.: US 10,315,412 B2
(45) Date of Patent: Jun. 11, 2019

(54) METHOD AND SYSTEM FOR REGISTERING PRINTING STATIONS OF A PRINTING PRESS

(71) Applicant: Advanced Vision Technology (AVT) Ltd., Hod Hasharon (IL)

(72) Inventors: Ohad Menashe, Tel-Aviv (IL); Dan Zamir, Hod Hasharon (IL); Shahar Golan, Petah Tikvah (IL); Haim Kreitman, Kfar Saba (IL); Chanan Gazala, Kfar Saba (IL)

(73) Assignee: Advanced Vision Technology (AVT) Ltd., Hod Hasharon (IL)

( * ) Notice: Subject to any disclaimer, the term of this patent is extended or adjusted under 35 U.S.C. 154(b) by 0 days.

(21) Appl. No.: 15/213,101

(22) Filed: Jul. 18, 2016

(65) Prior Publication Data

US 2016/0325542 A1 Nov. 10, 2016

Related U.S. Application Data

(63) Continuation-in-part of application No. 13/886,013, filed on May 2, 2013, now Pat. No. 9,393,772.
(Continued)

(51) Int. Cl.
*B41F 33/00* (2006.01)
*B41F 13/14* (2006.01)
(Continued)

(52) U.S. Cl.
CPC .......... *B41F 33/0081* (2013.01); *B41F 13/14* (2013.01); *G06T 7/001* (2013.01);
(Continued)

(58) Field of Classification Search
CPC ........................ B41F 33/0036; B41F 33/0081; B41F 13/025; B41F 13/12; B41P 2233/52;
(Continued)

(56) References Cited

U.S. PATENT DOCUMENTS

| 5,570,633 A | 11/1996 | Schultz et al. |
| 5,625,762 A | 4/1997 | Takizawa et al. |

(Continued)

FOREIGN PATENT DOCUMENTS

| DE | 198 55 177 | 6/2000 |
| DE | 202011109630 | 2/2012 |

(Continued)

OTHER PUBLICATIONS

European Search Report issued in European Patent Application No. 13166188, dated Apr. 26, 2016.

*Primary Examiner* — Matthew G Marini
*Assistant Examiner* — Leo T Hinze
(74) *Attorney, Agent, or Firm* — RatnerPrestia

(57) ABSTRACT

A method for registering a printing press, said printing press including a plurality of printing stations each for printing a respective color-image on a web, each said printing stations being associated with a respective different color, at least two pairs of said printing stations being un-registered, the method includes the procedures of identifying at least two regions-of-interest in the image to be printed, each including a respective different pair of two partially overlapping color-images, acquiring an image of the common area on the web, for each region-of-interest, chromatically separating the acquired image to determine two monochrome images respective of each region-of-interest, for each region-of-interest registering the two monochrome images respective thereof, registering a monochrome image respective of one region-of-interest with a monochrome image respective of another region-of-interest and determining a registration correction for each printing station according to the registration between the monochrome images.

12 Claims, 19 Drawing Sheets

Related U.S. Application Data

(60) Provisional application No. 61/641,563, filed on May 2, 2012, provisional application No. 61/817,885, filed on May 1, 2013.

(51) Int. Cl.
*G06T 7/00* (2017.01)
*G06T 7/30* (2017.01)

(52) U.S. Cl.
CPC .............. *G06T 7/30* (2017.01); *B41P 2233/13* (2013.01); *G06T 2207/10024* (2013.01); *G06T 2207/30144* (2013.01)

(58) Field of Classification Search
CPC ......... B41P 2233/13; H04N 1/60; H04N 1/54; H04N 1/58
See application file for complete search history.

(56) References Cited

U.S. PATENT DOCUMENTS

| | | | |
|---|---|---|---|
| 5,689,425 A | 11/1997 | Sainio | |
| 5,764,386 A | 6/1998 | Robinson | |
| 5,806,430 A | 9/1998 | Rodi | |
| 5,812,705 A | 9/1998 | Wang et al. | |
| 5,813,333 A | 9/1998 | Ohno | |
| 5,857,784 A | 1/1999 | Allen | |
| 5,974,967 A | 11/1999 | Bravenec | |
| 6,024,018 A | 2/2000 | Darel et al. | |
| 6,129,015 A | 10/2000 | Dewey | |
| 6,300,968 B1 * | 10/2001 | Kerxhalli | G03G 15/0152 347/116 |
| 6,782,814 B2 | 8/2004 | Tokiwa | |
| 6,796,240 B2 | 9/2004 | Sainio | |
| 7,040,232 B2 | 5/2006 | Van Holten et al. | |
| 7,219,606 B2 | 5/2007 | Mindrup | |
| 7,440,138 B2 | 10/2008 | Hofman | |
| 7,477,420 B2 | 9/2009 | Friedman et al. | |
| 7,826,095 B2 | 11/2010 | Wang et al. | |
| 7,894,098 B1 | 2/2011 | Dalton | |
| 7,966,935 B2 | 6/2011 | Loddenkoetter et al. | |
| 7,969,613 B2 | 6/2011 | Honeck et al. | |
| 9,393,772 B2 * | 7/2016 | Menashe | B41F 33/0036 |
| 2002/0026879 A1 | 3/2002 | Goldstein | |
| 2004/0163562 A1 | 8/2004 | Lewis, Jr. et al. | |
| 2005/0283722 A1 | 12/2005 | Warmus et al. | |
| 2007/0113748 A1 | 5/2007 | Geissler et al. | |
| 2011/0216120 A1 | 9/2011 | Friedman et al. | |

FOREIGN PATENT DOCUMENTS

| | | |
|---|---|---|
| EP | 1 428 659 | 3/2006 |
| EP | 2 327 548 | 6/2011 |
| WO | WO 2006/081950 | 8/2006 |
| WO | WO 2012/039719 | 3/2012 |

\* cited by examiner

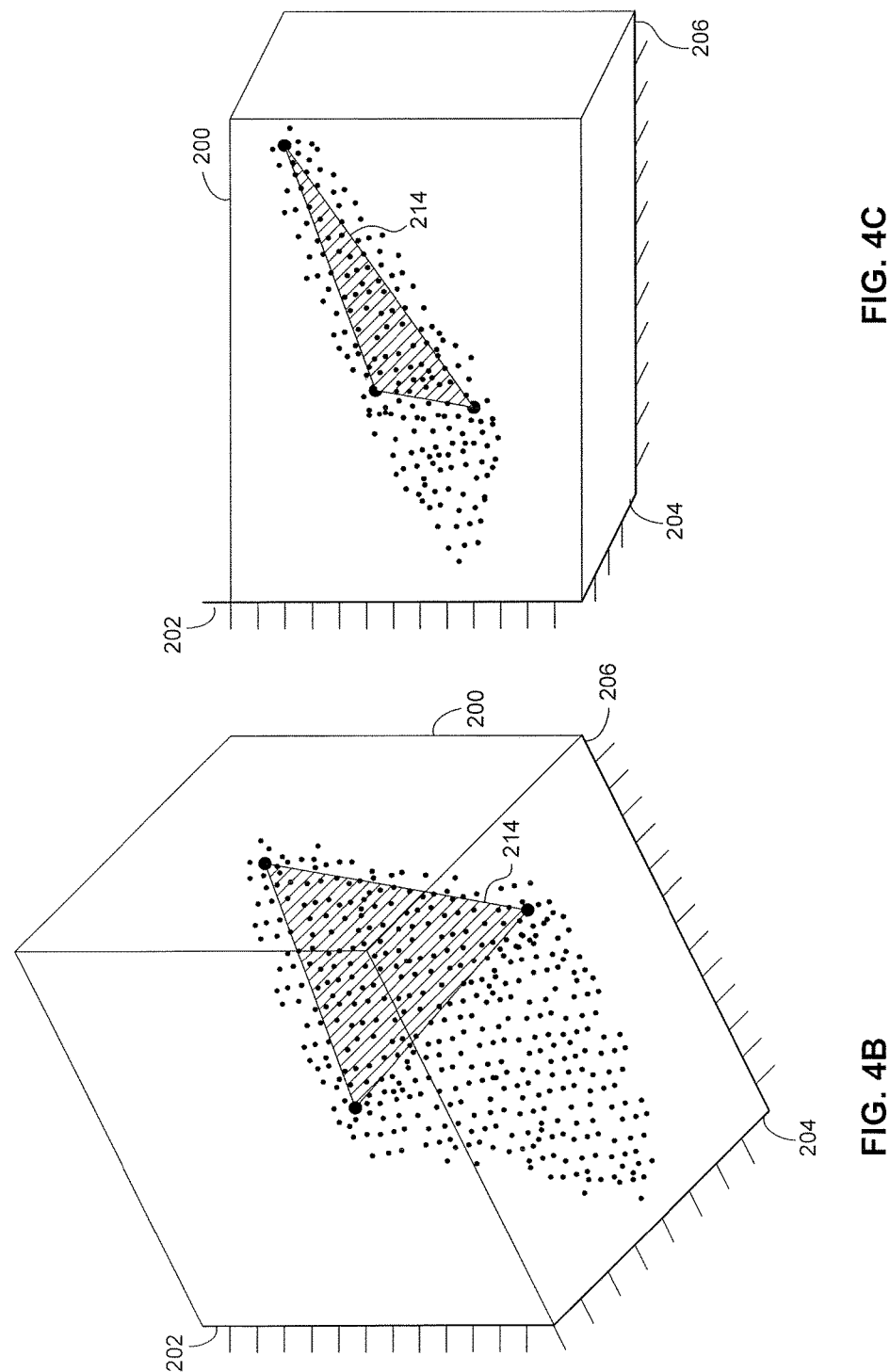

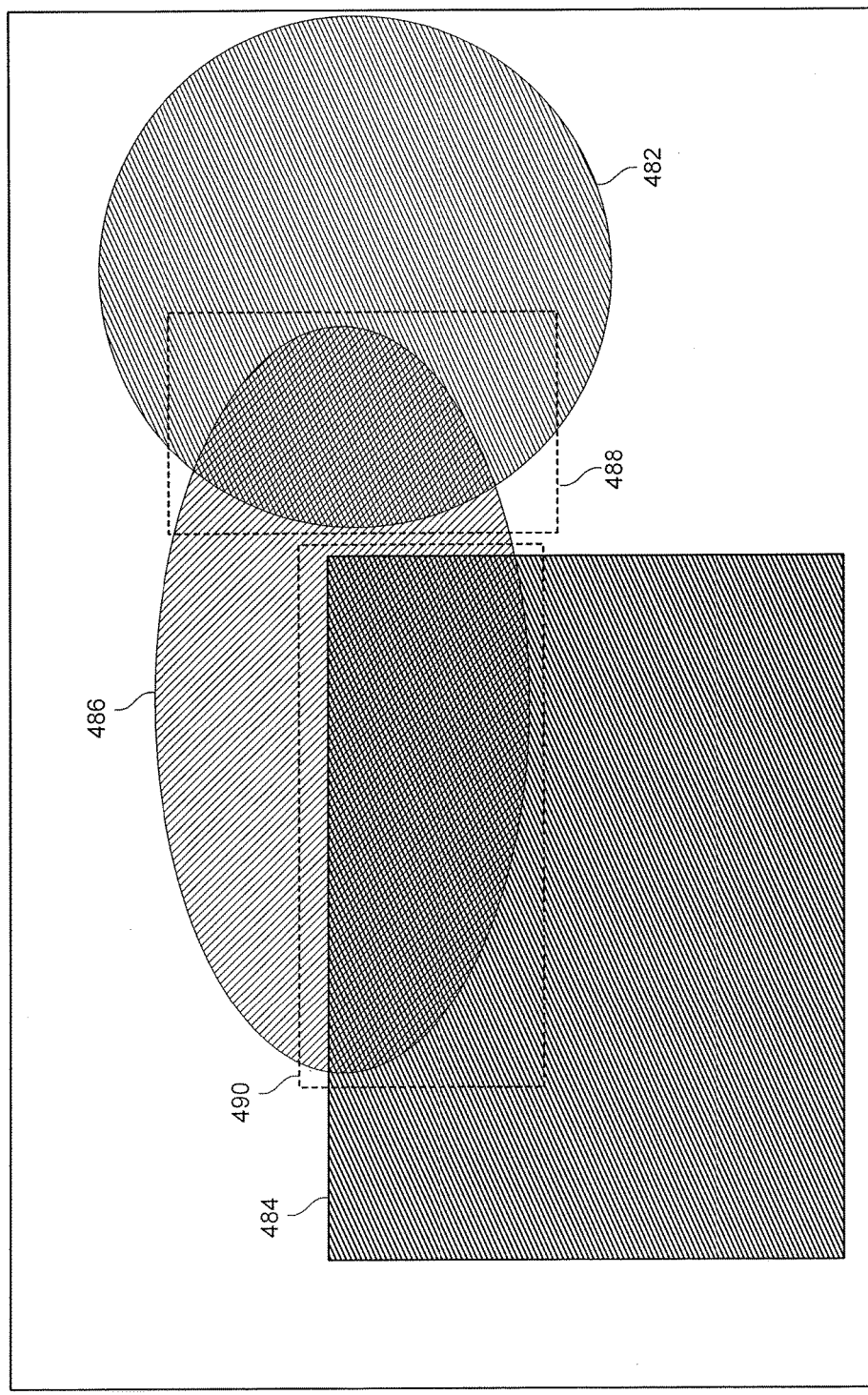

METHOD AND SYSTEM FOR REGISTERING PRINTING STATIONS OF A PRINTING PRESS

CROSS-REFERENCE TO RELATED APPLICATIONS

This application is a continuation-in-part of U.S. application Ser. No. 13/886,013, filed 2 May 2013, which claims benefit of U.S. Provisional Ser. No. 61/641,563, filed 2 May 2012, and U.S. Provisional Ser. No. 61/817,885, filed 1 May 2013, which applications are incorporated herein by reference. To the extent appropriate, a claim of priority is made to each of the above disclosed applications.

FIELD OF THE DISCLOSED TECHNIQUE

The disclosed technique relates to setting up printing presses in general, and to methods and systems for registering the printing stations of the printing press without requiring registration marks or targets, in particular.

BACKGROUND OF THE DISCLOSED TECHNIQUE

A printing press includes a plurality of printing stations. Each printing station prints a respective color image on a common area on the web. The color image exhibits a respective color. Thus, the printing press forms a printed image on the web. The color of each color image may be a process color in a color gamut such as Cyan Yellow, Magenta and Black (i.e., CYMK) or Red, Green and Blue (i.e., RGB) or a pantone color. A pantone color is a specially manufactured color that cannot be accurately produced from a combination of basic process colors. For the image to be printed correctly, the printing stations in the printing press must be in register with each other (i.e., each station prints the respective color image thereof at the respective location associated therewith), such that the images to be printed shall all be printed in the correct relative positions in the common area on the web.

U.S. Pat. No. 5,812,705 to Wang et al, entitled "Device for automatically aligning a production copy image with a reference copy image in a printing press control system", directs to a system which includes a 4 CCD camera coupled with a computer. The 4 CCD camera is operative to acquire an image of reference print in Red, Green, Blue and Infrared. This reference print serves as a hard proof of the live print. The reference image is converted into a monochrome image. Four object models are identified at each quadrant of the reference image. These object models are features in the image (i.e., transitions from dark to light) within a quadrant.

During the registration, the 4 CCD camera acquires a live image of the print. The live image is converted into a monochrome image. The computer then looks for a model within the models search region. Each potential find is given a score indicating the likelihood that the model was actually found. When the computer declares that the model was found (i.e., according to the score thereof), the computer defines a transfer function which maps the position of the found model to the position of the model found in the reference image.

U.S. Pat. No. 6,129,015 to Dewey, entitled "Method and apparatus for registering color in a printing press" directs to a method including the steps of identifying an area of the desired image that is intended to be printed in black, and forming registration images on the plate cylinders of the printing stations. The registration images are positioned on the plate cylinders such that, during subsequent printing operations, they will produce color registration marks that cooperate to print a process black registration mark on the web in the identified area (i.e., when the printing stations are in registration). The publication to Dewey further directs to a method comprising the steps of passing a web through the plurality of printing stations and printing a process black registration mark on the web. Furthermore, a black ink image on the web, adjacent to the process black registration mark, is printed. Thereafter, the process black registration mark and the black ink image are examined and an error signal is generated when the process black registration mark is not in desired registration relative to the black ink image. It is noted that the term 'registration marks' in the publication to Dewey refers to part of the image that is printed in process black and not in black.

U.S. Pat. No. 5,689,425 to Sainio, entitled "Color registration system for a printing press", directs to a system for generating a signal representing a color registration offset between at least two colors of an image, printed on a web. The system includes a memory which stores two reference arrays of digital data representative of the colors of at least a portion of the image. An imaging device is arranged in optical communication with the web, to produce analog signals representing the colors of the portion of the image. The system also includes a converter circuit which converts the analog signals to a color array of digital data. These arrays are stored in memory. The system further includes a processing circuit in communication with the converter circuit and the memory. For each color, the processing circuit, phase correlates the reference array of one color with the on-press array of that same color and phase, and determines a registration offset between the colors. The processing circuit produces a signal representing the registration offset between the colors.

PCT Publication WO 2006/081950, to Loddenkoetter et al, entitled "Registering Method", directs to a method for registering a rotary press with a plurality of inking mechanisms. According to the method directed to by Loddenkoetter et al, a longitudinal screen mark and a horizontal screen mark are mounted at a fixed position on the frame of the rotary press in front of an optical sensor. These screen marks represent the required position of the printed image. Each printing station, in the rotary printing, prints the respective image thereof. An optical sensor acquires an image of the printed images. The position of the printed images relative to the screen marks are apparent on the image acquired by the optical sensor. An operator adjusts the location of the printed image accordingly, until the printed images are flush with the screen mark.

German patent application DE19855177, to Krümpelmann, entitled "Method for the Automatic Adjustment of Circumference and Side Registers of Press Cylinders", directs to a method for adjusting individual printing units in a printing press. Each printing unit prints a print image. The printing press prints superimposed print images. The method includes the steps of selecting a print image printed by a printing unit as a reference image, recording with a camera the superimposed print images and comparing the actual position of the print images with respect to each other, and with respect to the desired position of each print image. The method further includes the steps of generating correcting signals for adjusting the press cylinders circumferential or side registers and actuating motors of the press cylinders according to the generated correcting signals. The reference print image may be the first print image or one that exhibits simple composition.

SUMMARY OF THE PRESENT DISCLOSED TECHNIQUE

It is an object of the disclosed technique to provide a novel method and system for registering the printing stations of a printing press without the use of registration marks or targets.

In accordance with the disclosed technique, there is thus provided a method for registering a printing press, the printing press includes a plurality of printing stations each for printing a respective color image on a web. Each printing station is associated with a respective different color, at least two pairs of the printing stations are un-registered one with respect to the other. The method includes the procedures of identifying at least two regions of interest in the image to be printed, each region includes a respective different pair of at least two partially overlapping color images of different colors and acquiring an image of the common area on the web after the pairs of printing stations printed the respective color images thereof. The method further includes the procedure of chromatically separating the acquired image to determine two monochrome images respective of each region of interest for each region of interest and registering the two monochrome images respective of for each region of interest. The method also includes the procedures of registering a monochrome image respective of one region with a monochrome image respective of another region of interest and determining a registration correction for each printing station according to the registration between the monochrome images.

In accordance with another aspect of the disclosed technique, there is thus provided a system for registering a printing press, the printing press includes a plurality of printing stations each for printing a respective color image on a web, each the printing stations is associated with a respective different color, at least two of the printing stations is un-registered. The system includes and imager and a processor coupled with the imager. The imager acquires an image of a common area of the web, of at least two color images respective of the at least two printing stations. For each region of interest, the processor chromatically separates the acquired image to determine two monochrome images respective of each region of interest and registers the two monochrome images respective thereof. The processor further registers a monochrome image respective of one region with a monochrome image respective of another region of interest. The processor also determines a registration correction for each printing station according to the registration between the monochrome images. At least two regions of interest are identified in the image to be printed each region includes a respective different pair of at least two partially overlapping color images of different colors.

BRIEF DESCRIPTION OF THE DRAWINGS

The disclosed technique will be understood and appreciated more fully from the following detailed description taken in conjunction with the drawings in which:

FIGS. 4A-4H are schematic illustrations of the stages of the chromatic separation registration of two un-registered printing stations printing the respective color images thereof, in accordance with another embodiment of the disclosed technique;

FIG. 11 is a schematic illustration of an exemplary reference image, which is to be printed on a web, in accordance with another embodiment of the disclosed technique.

DETAILED DESCRIPTION OF THE EMBODIMENTS

Figure 1:
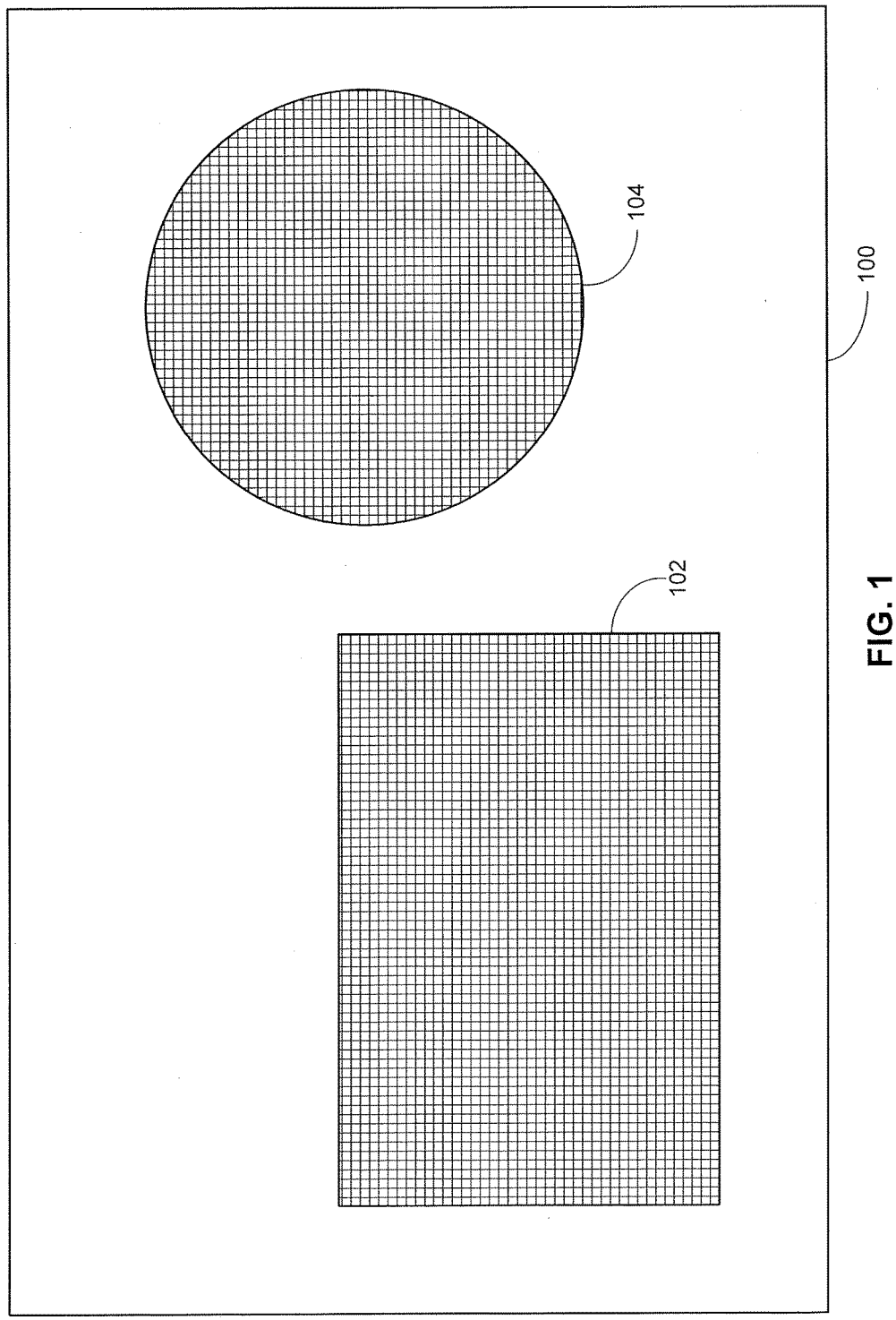
FIG. 1 is a schematic illustration of an exemplary image, in accordance with an embodiment of the disclosed technique.

The disclosed technique overcomes the disadvantages of the prior art by providing a method and a system for registering the printing stations of a printing press without the use of registration marks or targets. As mentioned above each image is composed of a plurality of color images. Each color image is associated with a respective color. Each color image is printed on respective location in a common area on the web, by a corresponding printing station. Since the printed stations may not be in register one with respect to the other, the color images may not be printed on the respective location thereof. The term "printing station" herein refers to printing stations which transform the appearance a web (e.g., by transferring ink onto the web or by coating the printed or unprinted web) as well as transforming the shape of the web (e.g., by embossing the web).

Two selected printing stations are registered by printing on the web each of the two corresponding selected color images, composing a part of the image to be printed. The two printed color images may exhibit overlap of the design features to be printed, one with respect to the other. An imager acquires an image of the common area of the web and the composite printed image thereon (i.e., composed of the two colors). However, to register the two printing stations, the two printed color images should be separated from the composite image (i.e., two separate images should be determined from the composite printed image on the web, one for each color). Thus, the location on the web of one selected color image relative to the other selected color image can be determined. According to the disclosed technique, the two selected color images are either chromatically separated or spatially separated, to determine at least a portion of each of the two selected color images. These determined portions of the selected color images are registered one with respect to the other. Consequently, the printing stations associated with these two color images are also registered one with respect to the other. All the printing stations in the printing press are registered one with respect to the other by registering N-1 different pairs of printing stations, where N is the number of printing stations in the printing press.

According to the disclosed technique, two selected color images are chromatically separated by simultaneously printing the two selected color images on the common area of the web and acquiring an image of the printed color images. The color coordinates (i.e., the location), in a selected color space, of each pixel in the acquired image, are determined. A color projection plane, in the selected color space, is also determined. This color projection plane is defined by the coordinates, in the selected color space, of the background (i.e., the color of the web) and the coordinates of the colors of each of the two selected colors images. The location of each pixel in the selected color space is projected on the color projection plane. The color projection plane is then transformed to a two-dimensional color separation space. Each axis in the two-dimensional color separation space corresponds to a respective one of the un-registered colors. Each projected pixel is then associated with a respective location in the two-dimensional color separation space. For each color, a respective monochrome image is determined according to the coordinate value (i.e., in the two-dimensional color separation space) of each pixel, corresponding to that color. The two monochrome images are then registered one with respect to the other either directly or with respect to a respective color layer in a reference image. Thus, the printing stations corresponding to the two color images are registered one with respect to the other.

Further according to the disclosed technique, the two selected color images are spatially separated by printing a portion of one color image on one side of the common area of the web, and printing a portion of the other color image on the opposite side of the common area of the web. Generally, a press machine has two sides. One side is the operator side, where the operator stands and along which he walks while working. The opposite side to the operator side is the driver side where the printing press is located. An imager acquires an image of the common area with the two portions printed thereon and a processor registers each side of the acquired image with a respective color layer in reference image of the multi-color image to be printed. Thus, the two color images, and consequently the two respective printing stations, are registered one with respect to the other.

Reference is now made to FIG. 1, which is a schematic illustration of an exemplary image, generally referenced 100, in accordance with an embodiment of the disclosed technique. Image 100 includes two objects, a rectangle 102 and a circle 104. Rectangle 102 and circle 104 in image 100 are composed of two color images, each exhibiting a respective color. The color respective of the first color image is represented by horizontal lines and the color respective of the second color image is represented by vertical lines. In general, each image to be printed on a web may be composed of a plurality of color images, together forming a multi-color image to be printed on a common area on the web. For image 100 to be printed correctly, the printing stations printing of the printing press, which print the color images composing image 100, should all be registered one with respect to the other. In other words, each printing station, should print the respective color image thereof, at the location corresponding to that color image in the common area on the web. In image 100, the color image represented by the horizontal lines is registered with respect to the color image represented by the vertical lines.

Figure 2:
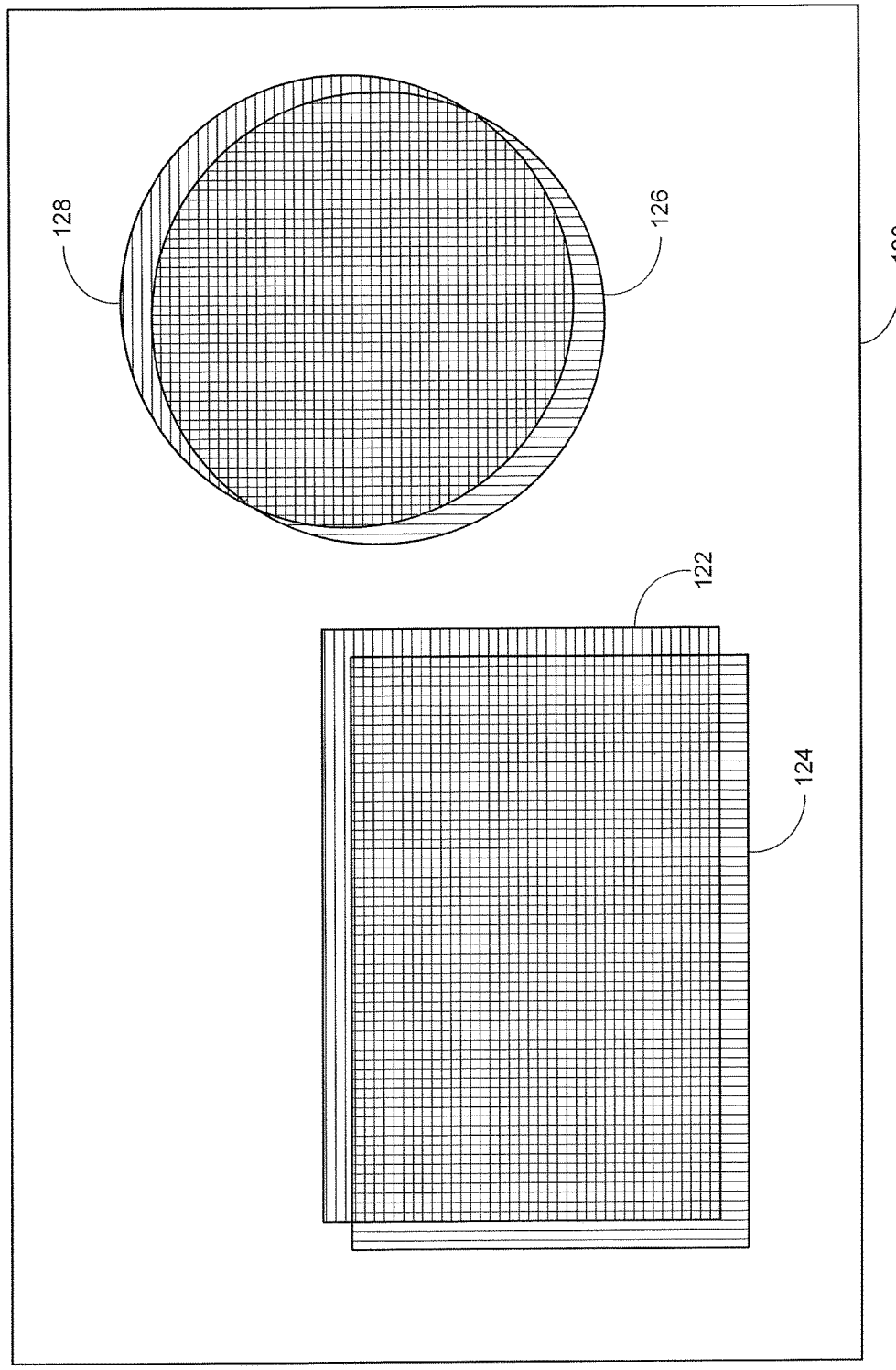
FIG. 2 is a schematic illustration of an exemplary image, in accordance with another embodiment of the disclosed technique where the two printing stations corresponding to the printed color images are not registered one with respect to the other.

Reference is now made to FIG. 2, which is a schematic illustration of an exemplary image, generally referenced 120, in accordance with another embodiment of the disclosed technique where the two printing stations corresponding to the printed color images are not registered one with respect to the other. Similar to Image 100 (FIG. 1), image 120 is composed of two color images. The first color image is represented by horizontal lines and the second color image is represented by vertical lines. In image 120, the two color images are not registered. Thus, the image to be printed is not printed as intended. In image 120 rectangle 122 and circle 128 of the first color image are visible on image 120 as well as rectangle 124 and circle 126 of the second color image.

Figure 3:
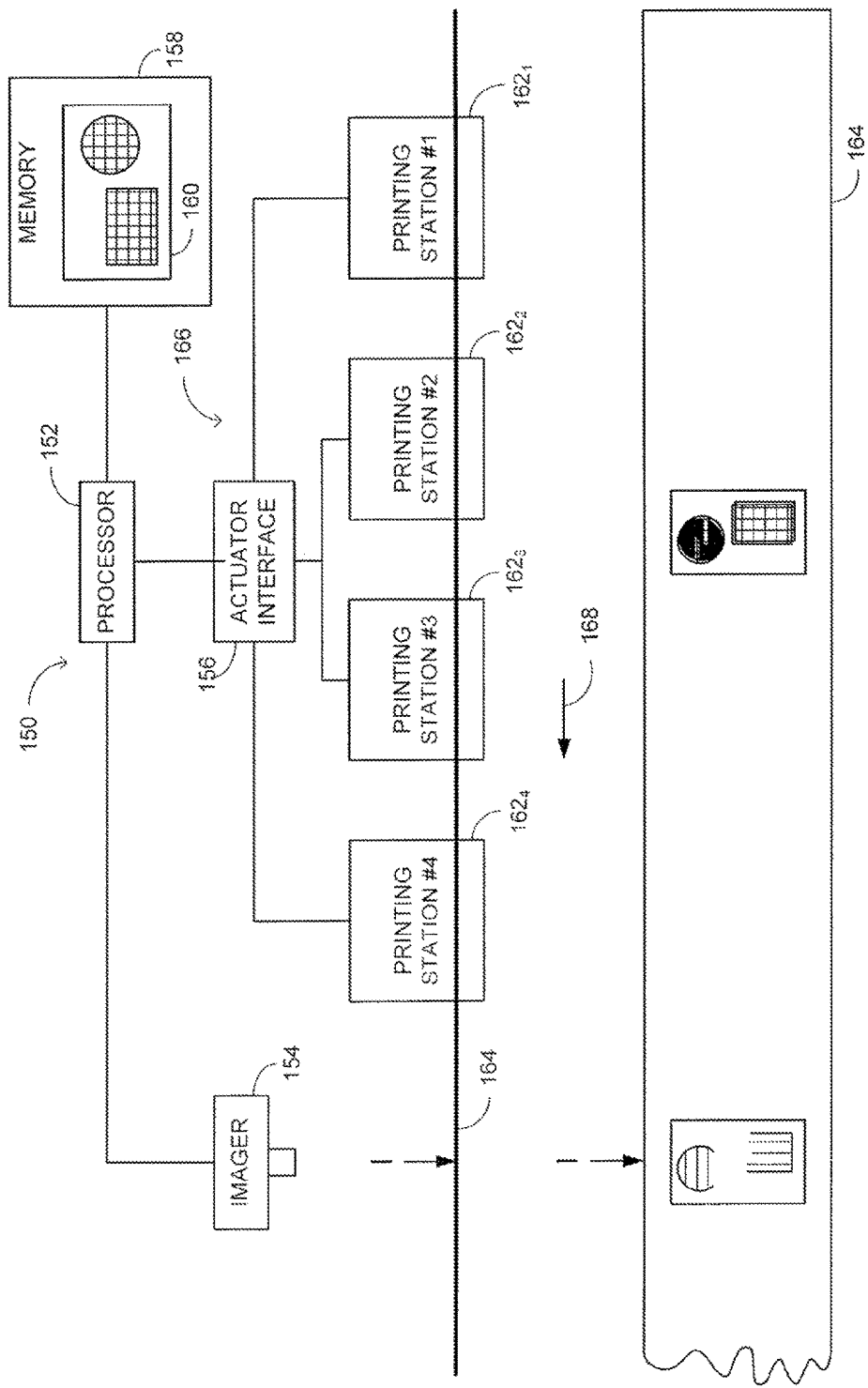
FIG. 3 is schematic illustration of a system for registering printing stations in a printing press, constructed and operative in accordance with a further embodiment of the disclosed technique.

Reference is now made to FIG. 3, which is schematic illustration of a system, generally referenced 150, for registering printing stations in a printing press, constructed and operative in accordance with a further embodiment of the disclosed technique. System 150 includes a processor 152, an imager 154, an actuator interface 156 and a memory 158. Processor 152 is coupled with imager 154 with actuator interface 156 and with memory 158. Actuator interface 156 is coupled with respective actuators (not shown) of rollers (not shown) of printing stations $162_1$, $162_2$, $162_3$ and $162_4$. Memory 158 stores a reference image 160 of the multi-color image to be printed. Reference image 160 includes the different color layers from which the multi-color composite image to be printed is composed. A web 164 passes through a plurality of rollers (not shown) of each of printing stations $162_1$, $162_2$, $162_3$ and $162_4$, in sequence, in a direction designated by an arrow 168. Each one of printing stations $162_1$, $162_2$, $162_3$ and $162_4$ is associated with a respective color image (e.g., corresponding a respective color layer in the reference image). Each one of printing stations $162_1$, $162_2$, $162_3$ and $162_4$ prints the respective color image thereof on web 164. Printing stations $162_1$, $162_2$, $162_3$ and $162_4$, together with web 164, constitute a printing press 166. Imager 154 may be embodied as a line-scan imager, which includes one-dimensional line detector such as a Charged Coupled Device (CCD) detector, a Complementary Metal Oxide Semiconductor (CMOS) detector and the like, that acquires a plurality of one-dimensional images. The plurality of one-dimensional images, form a two-dimensional spatial image. Alternatively, imager 154 can be embodied as an area camera, which includes a two-dimensional area detector that acquires a two-dimensional spatial image directly. Imager 154, being either a line scan camera or an area camera may be a color imager, which acquires images, where the color of each pixel is associated with a respective location in a selected color space, such as RGB (Red Green and Blue), CYMK (Cyan Yellow Magenta and Black), CIEXYZ and the like.

Following is a description of chromatic separation registration. Reference is now made to FIGS. 4A-4H, which are schematic illustrations of the stages of the chromatic separation registration of two un-registered printing stations printing the respective color images thereof, in accordance with another embodiment of the disclosed technique, and referring to FIG. 3. Each of the two un-registered color images is printed by the respective one of printing station $162_1$, $162_2$, $162_3$ and $162_4$ of printing press 166.

Figure 4A:
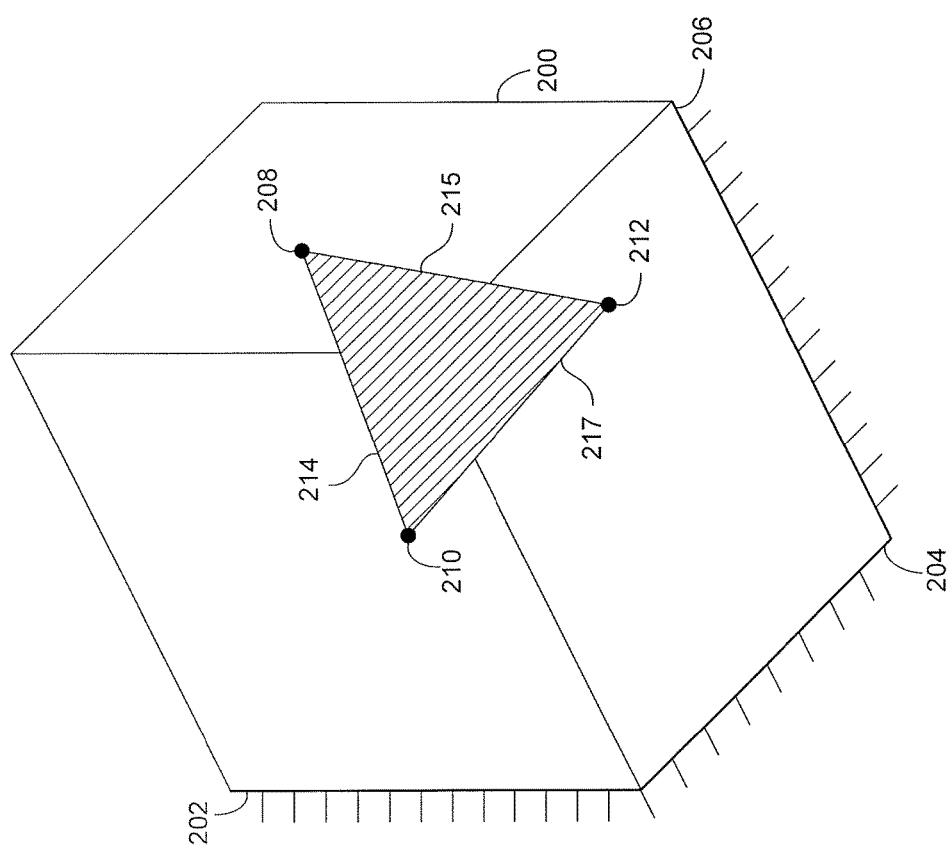

Initially, a color space 200 is selected, for example, by the user of the system or by the designer of the multi-color image to be printed. This color space is, for example, the RGB color space, the CMKY color space, the CIEXYZ color space, the CIELab color space, CIELuv color space and the like. In FIGS. 4A-4E, color space 200 is, for example, the RGB color space and includes three dimensions 202, 204 and 206. Each one of dimensions 202, 204 and 206 corresponding to one of the basic colors. With reference to FIGS. 3 and 4A, processor 152 determines a color projection plane 214 in color space 200. Color projection plane 214 is defined by the location (i.e., the color coordinates), in color space 200, of each of the two colors respective of the selected colors images and the location in color space 200 of the background (i.e., the color of the web). For example, point 208 in FIG. 4A, corresponds to the location of the color represented by the horizontal lines in FIG. 1, point 210 in FIG. 4A, corresponds to the location of the color represented by the vertical lines in FIG. 1 and point 212 corresponds to the location of the color of the background of the image to be printed.

In the example brought forth, color space 200 is a linear space. The intensity values (e.g., between 0 and 255) of the each selected color, are located on a line between the location of the background color and the location of the corresponding color. For example, the intensity values of the color corresponding to point 208 (i.e., the color represented by the horizontal lines in FIG. 1) are located on line 215. The intensity values of the color corresponding to point 210 (i.e., the color represented by the vertical lines in FIG. 1) are located on line 217. Line 215 and line 217 intersect at point 212 (i.e., corresponding to the color of the background). These two lines define color projection plane 214. In a linear space, color projection plane 214 is an affine plane. Points on this plane represent the different combinations of the two selected colors. In general, when the selected color space is not linear, location of the background and the two selected colors define a two-dimensional manifold.

Processor 152 determines the coordinates of the selected colors and the background from a reference image 160, stored in memory 158, where the different color layers of the multi-color image to be printed are defined. Alternatively, each printing station separately prints the respective color image thereof and imager 154 acquires a respective different image of each printed color image. Furthermore, imager 154 acquires an image of the web without any matter printed thereon. Imager 154 provides these respective different images and the image of the web without any matter printed thereon, to processor 152. Processor 152 determines the color coordinates of the pixels in each respective different image and of the image of the web in selected color space 200. In case the color space employed by imager 154 is different from selected color space 200, processor 152 transforms the color coordinates values of the pixels in the acquired image to correspond to coordinates in selected color space 200.

To register the two color images, printing press 166 prints the two selected color images on web 164 simultaneously. The result is for example, image 120 (FIG. 2). Imager 154 acquires an image of the printed color images and provides this acquired image to processor 152. The acquired image includes a plurality of pixels. Each pixel exhibits a respective color associated with a respective location in color space 200. FIGS. 4B and 4C, depict the location (i.e., the color coordinates), in color space 200, of the color of each pixel in the acquired image, along with projection plane 214.

Figure 4E:
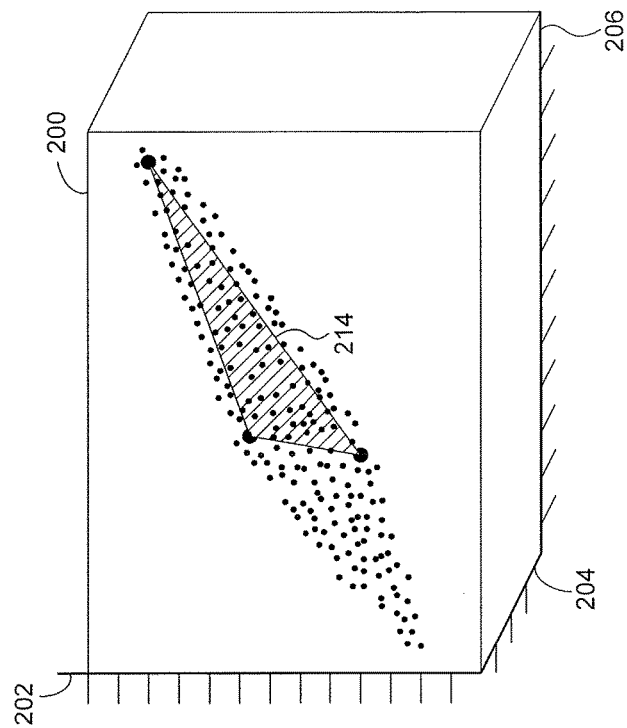
Figure 4D:
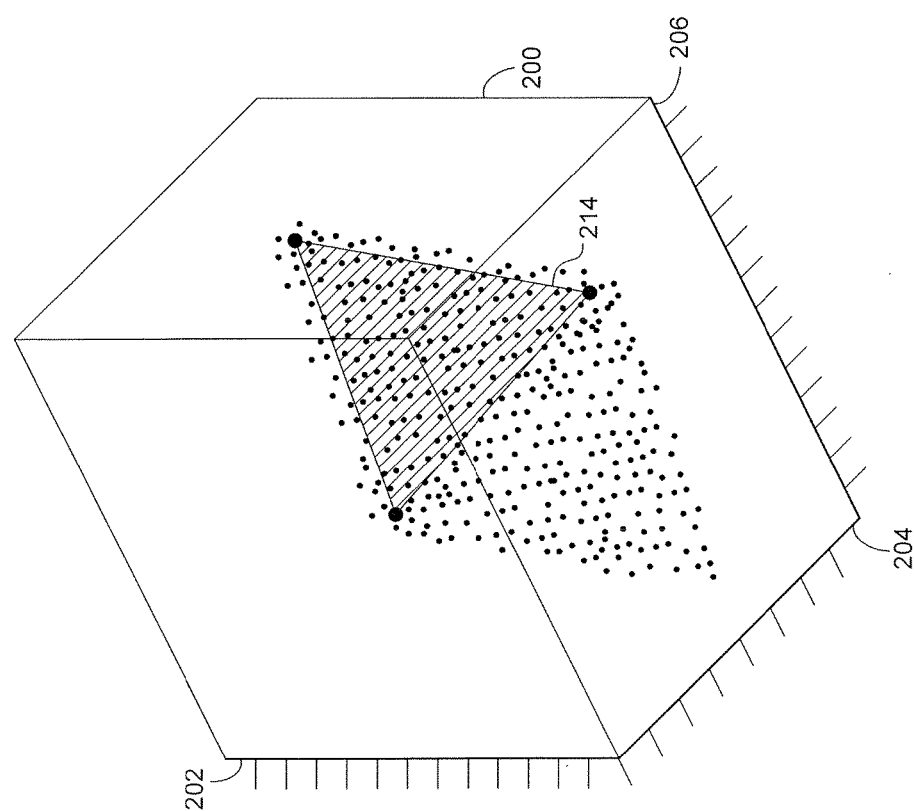

Thereafter, With reference to FIGS. 4D and 4E processor 152 projects the location of each pixel onto color projection plane 214. Processor 152 determines the projection of a pixel onto color projection plane 214 according to the point of intersection of a line (not shown) with color projection plane 214, the line being perpendicular to color projection plane 214 and passing through the location of the pixel.

Figure 4F:
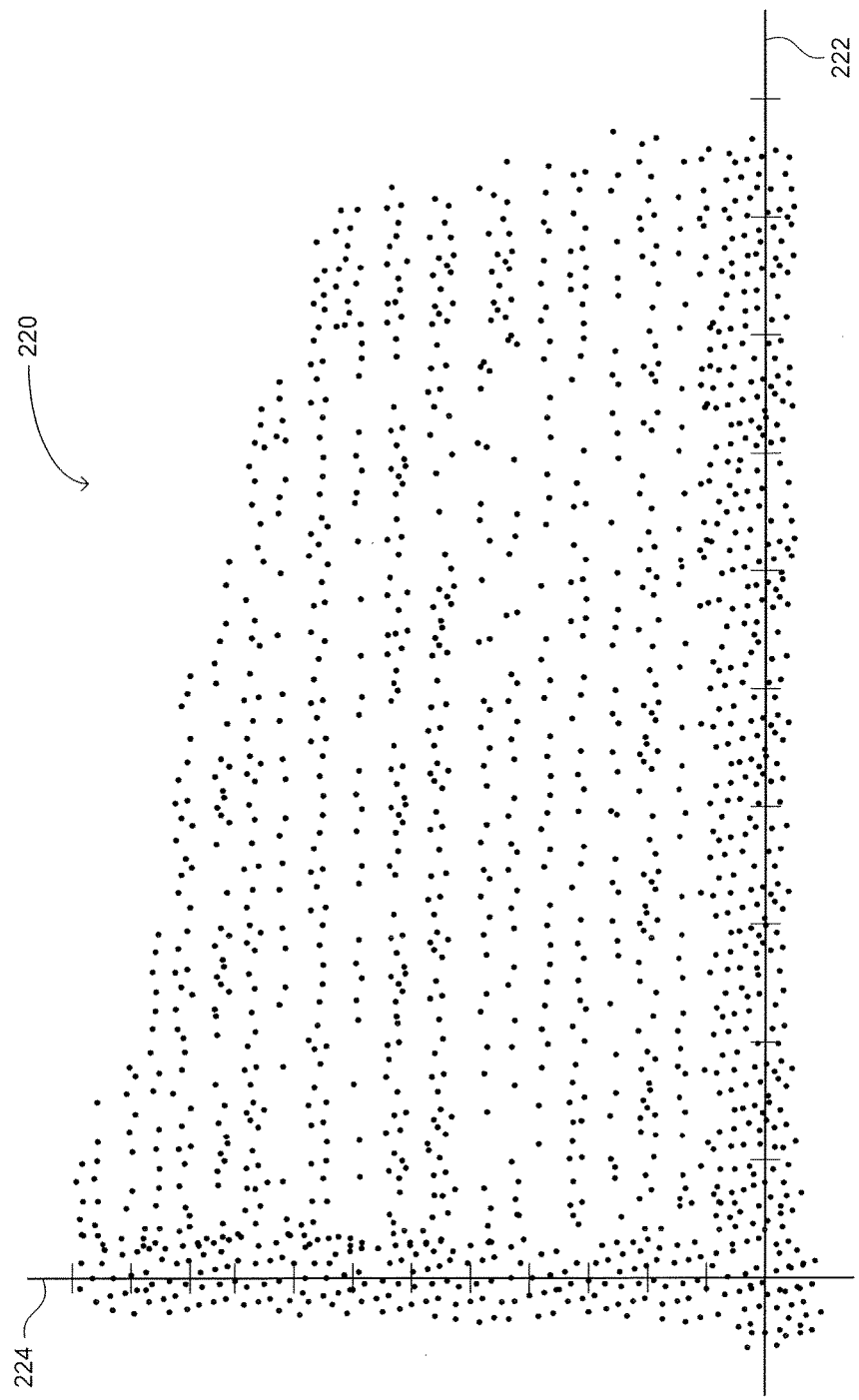

With reference to FIG. 4F, processor 152 transforms color projection plane 164 into a two-dimensional color separation space, generally reference 220. Two-dimensional color separation space 220 includes two axes, axis 222 and axis 224. Axis 222 corresponds to a vector connecting the background color to one color of one of the selected color images and axis 224 corresponds to a vector connecting the background color to the other color of the other selected color image. In other words, two-dimensional color separation space 220 is determined by selecting the location of the background color in color space 200 and two axes on color projection plane 214, which correspond to the two selected colors. Points 208, 210 and 212 (FIG. 4A) also define a parallelogram. However since this parallelogram may exceed beyond the boundaries of color space 200 (i.e., the parallelogram is clipped), the boundaries of color space 200 together with points 208 210 212 define the clipped parallelogram. Processor 152 transforms this clipped parallelogram into a unit square. Processor 152 also applies this transformation to each of the projected pixel locations on color projection plane 214 (FIG. 4A). Thus, each projected pixel location is associated with a respective location (i.e., coordinates) in two-dimensional color separation space 220. It is noted that, since in the example brought forth, color space 200 is a linear space, two-dimensional color separation space 220 is an affine space. It is further noted the when coordinate values of the pixels in two-dimensional color separation space 220 exceeded the limits of the space, the coordinate of these exceeding pixels are clipped to the limits of the space.

Figure 4G:
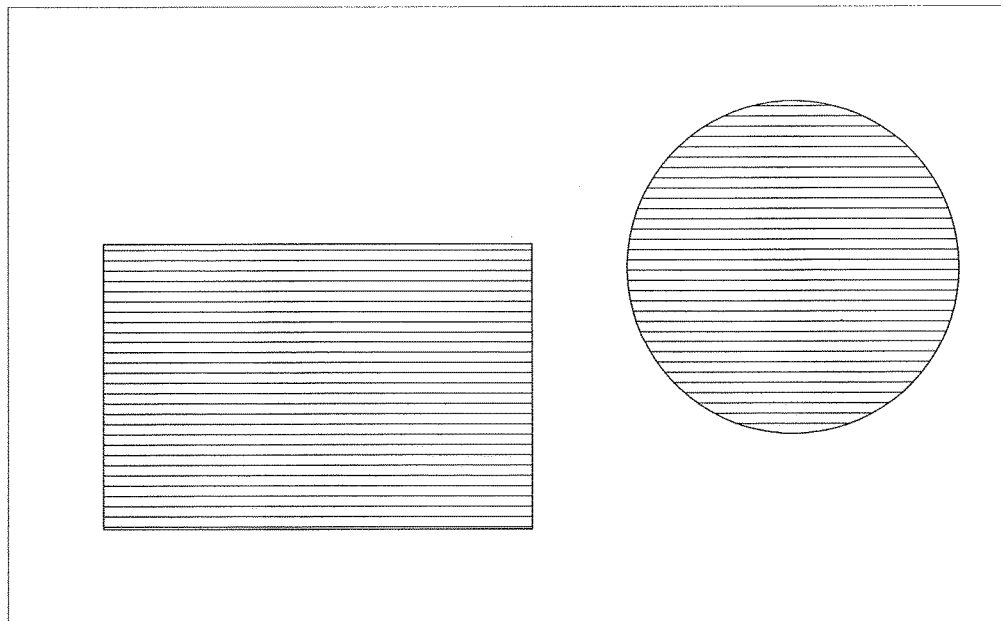
Figure 4H:
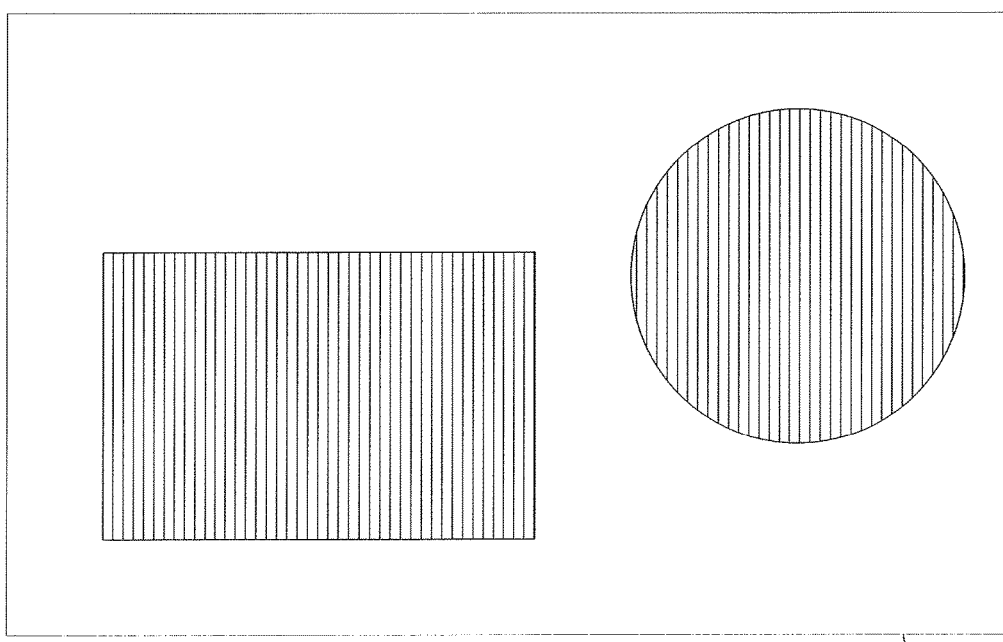

With reference to FIGS. 4G and 4H, processor 152 determines a respective monochrome image for each color from the location of each pixel in two-dimensional color separation space 220. The coordinate of each pixel in two-dimensional color separation space 220 represents the contribution of each selected color to the color of the pixel. In other words, each pixel in the original image is associated with two values representing the contribution of each selected color to the color of the pixel, one value associated with axis 222 and the other value associated with axis 224. Arranging these values into two respective images, each image being determined according to the values associated with one axis, results in two images, each representing one of the selected colors. These images are referred to herein as 'monochrome images'.

Processor 152 determines a first monochrome image 230 for the color represented by the horizontal lines and a second monochrome image 232 for the color represented by the vertical lines. Processor 152 determines each of first monochrome image 230 and second monochrome image 232 according to the values of the coordinates of the pixels, corresponding to a respective one of the axes of two-dimensional color separation space 220. For example, processor 152 determines first monochrome image 230 according to the coordinate values corresponding to axis 222 of the pixels. Processor 152 determines second monochrome image 232 according to the coordinate values corresponding to axis 224. Processor 152 registers first monochrome image 230 and second monochrome image 232 one with respect to the other directly. Alternatively, processor 152 registers each of first monochrome image 230 and second monochrome image 232 with respect to a reference image and thus with each other. Once processor 152 registers first monochrome image 230 and second monochrome image 232 one with respect to the other, processor 152 instructs actuator interface 156 to move the rollers of at least one of the respective ones of printing stations $162_1$, $162_2$, $162_3$ and $162_4$ to the registered locations thereof.

Figure 5:
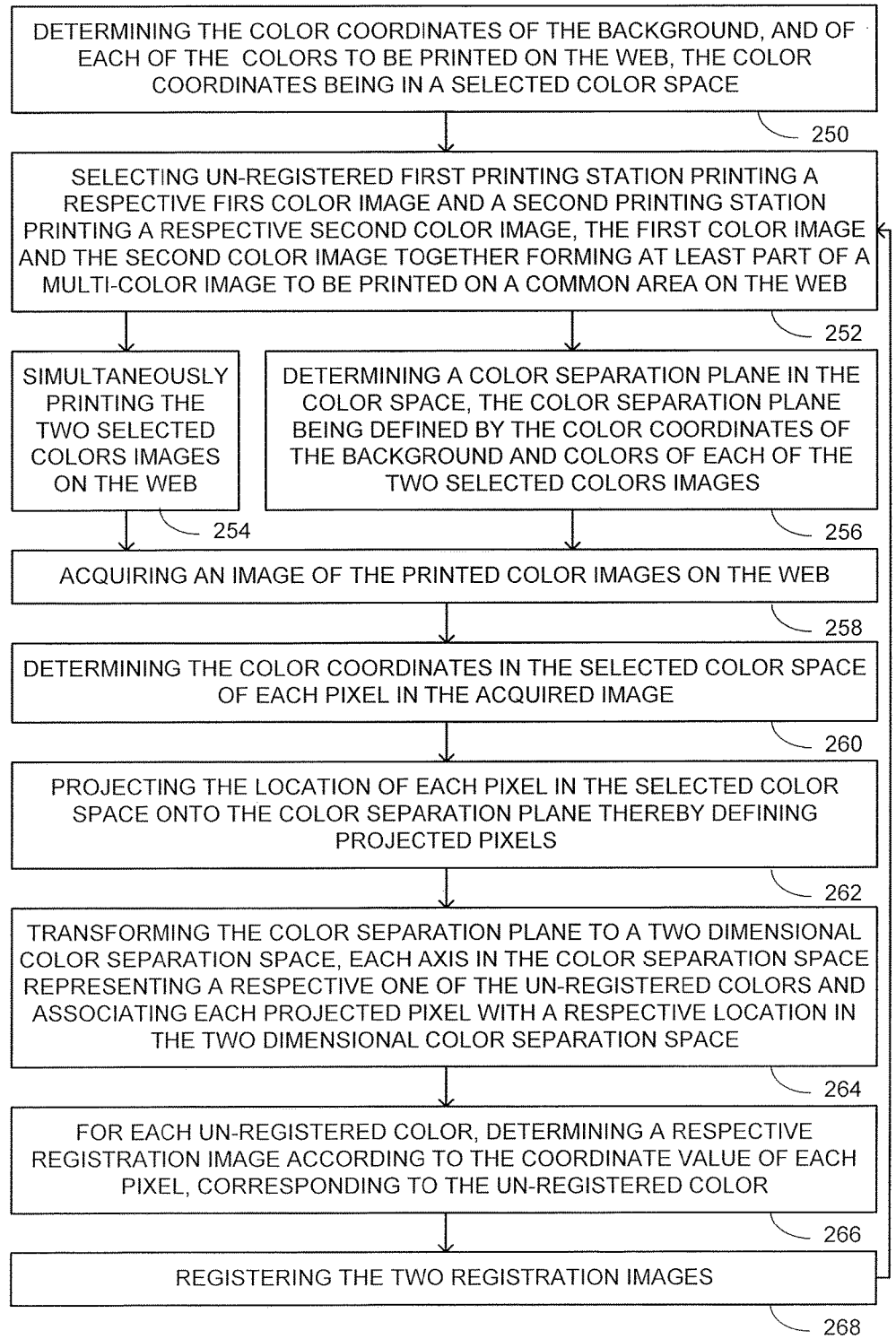
FIG. 5 is a schematic illustration of a method for registering the printing stations of a printing press without the use of registration marks or targets, operative in accordance with a further embodiment of the disclosed technique.

Reference is now made to FIG. 5, which is a schematic illustration of a method for registering the printing stations of a printing press without the use of registration marks or targets, operative in accordance with a further embodiment of the disclosed technique. In procedure 250, the color coordinates of the background, and of each of the colors to be printed on the web are determined, the color coordinates of the background and of the colors to be printed are determined in a selected color space (e.g., RGB, CMKY, CIEXYZ, CIELab, CIELuv and the like). With reference to FIGS. 3 and 4A, processor 152 determines color projection plane 214 in color space 200.

In procedure 252, an un-registered first printing station printing a respective first color image and second printing station printing a respective second color image are selected. The first color image and the second color image together forming at least part of a multi-color image to be printed on a common area on the web. With reference to FIG. 3, processor 152 selects an un-registered first printing station printing a respective first color image and second printing station printing a respective second color image. After procedure 252, the method proceeds to procedure 254 and to procedure 256.

In procedure 254, the two selected colors images are printed simultaneously on the web. With reference to FIG. 3, printing press 166 prints the two selected color images.

In procedure 256, a color projection plane is determined in the selected color space. The color projection plane is defined by the coordinates of the background (i.e., the web) and the coordinates of each of the two selected colors in the selected color space. The coordinates of the color of the web and the coordinates of each of the two selected colors, in the selected color space are determined by from a reference image. The reference image defines the different color layers of the multi-color image to be printed. Alternatively, each printing station separately prints the respective color image thereof and a respective different image of each printed color image is acquired. Also, an image of the web without any matter printed thereon is acquired. Thereafter, the color coordinates in selected color space of the pixels in each respective different image and of the image of the web is determined. With reference to FIGS. 3 and 4A, processor 152 determines color projection plane 214 in color space 200.

In procedure 258, an image of the color images printed on the web is acquired. This image may be acquired by an area color imager. Alternatively, a plurality of one-dimensional images are acquired by a line-scan color camera and combined into a two-dimensional image. With reference to FIG. 3, imager 154 acquires an image of the printed color images.

In procedure 260, the color coordinates in the selected color space, of each pixel in the acquired image, are determined. The color of each pixel is associated with respective color coordinates (i.e., a location) in the selected color space. With reference to FIGS. 3, 4B and 4C, processor 152 determines the color coordinates of each pixel in the acquired image, in color space 200.

In procedure 262, the location of each pixel of the acquired image, in the selected color space, is projected onto the color projection plane, thereby defining projected pixels. Accordingly, all the projected pixels are located on the color projection plane. With reference to FIGS. 3, 4D and 4E, processor 152 projects the location of each pixel of the acquired image, in the selected color space, onto color projection plane 214.

In procedure 264, the color projection plane is transformed into a two-dimensional color separation space. Each axis in the two-dimension color separation space represents a respective one of the printed colors. Accordingly, each projected pixel is associated with a respective coordinates in the two-dimensional color separation space. As mentioned above, the coordinates of background and of each of the two selected colors in the selected color space together with color space 200 define a parallelogram. This parallelogram may be transformed into a unit square defining a two-dimensional space. With reference to FIGS. 3 and 4F, processor 152 transforms color projection plane 214 into two-dimensional color separation space 220.

In procedure 266, a respective monochrome image is determined for each un-registered color. This monochrome image is determined according to the coordinate value of each pixel (i.e., in the two-dimensional color separation space) corresponding to the un-registered color. With reference to FIGS. 3, 4F, 4G and 4H, processor 152 determines a first monochrome image 230 according to according to the coordinate values corresponding to axis 222 of the pixels. Processor 152 determines second monochrome image 232 according to the coordinate values corresponding to axis 224.

In procedure 268, the two monochrome images are registered one with respect to the other. Thus, the two printing stations associated with to the two selected color images are registered one with respect to the other. With reference to FIG. 3, processor 152 then registers first monochrome image 230 and second monochrome image 232 one with respect to the other directly. Alternatively, processor 152 registers first monochrome image 230 with second monochrome image 232 using a reference image (e.g., a Portable Document Format—PDF). After procedure 218, the method returns to procedure 252 to register another pair of un-registered color images. The method will repeat until N-1 pairs of printing stations have been registered, where N is the number of printing stations in the printing press. It is noted that the set of N-1 pairs must include each printing station at least once (i.e., each printing station should print at least once).

The N-1 pairs are selected according to a cost function determined for each possible pair of printing station. The cost function is determined according to two values, a spatial value and a chromatic value. The spatial value corresponds to the overlap in the design features in the corresponding reference color images (i.e., the corresponding color layer in the reference image) of each pair of printing stations. The chromatic value corresponds to the dot product of two vectors. The first vector being defined according to the location (i.e., in the selected color space) of the background and the location of the first color and the second vector is defined according to the location of the background and the location of the second color. The dot product between these vectors is also referred to herein as the 'color vector dot product'

Figure 6B:
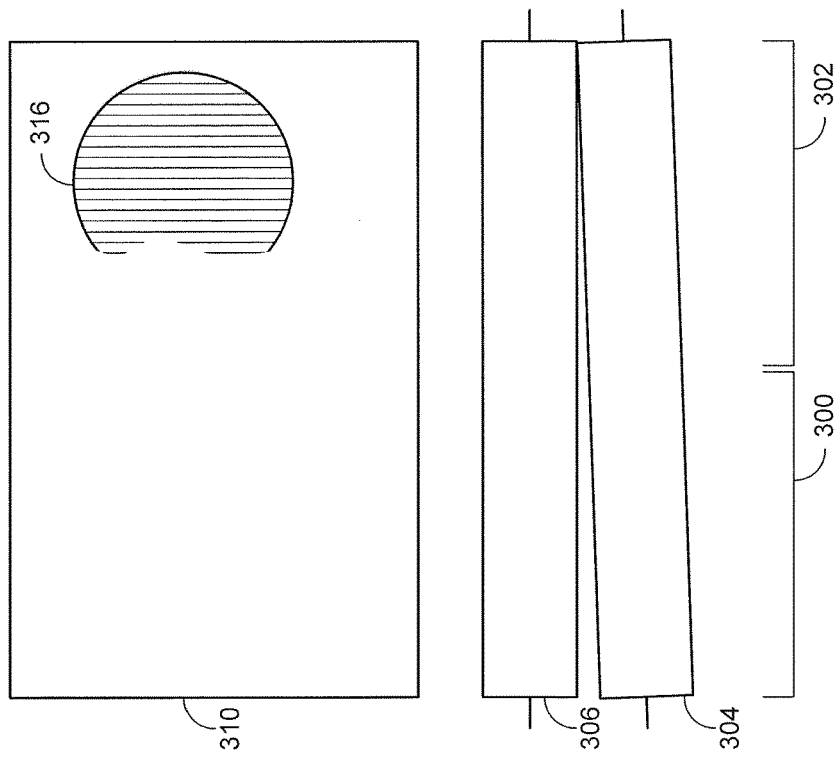
FIGS. 6A-6C are schematic illustrations of the stages of the spatial separation registration of two un-registered printing stations printing the respective color images thereof, in accordance with another embodiment of the disclosed technique.
Figure 6A:
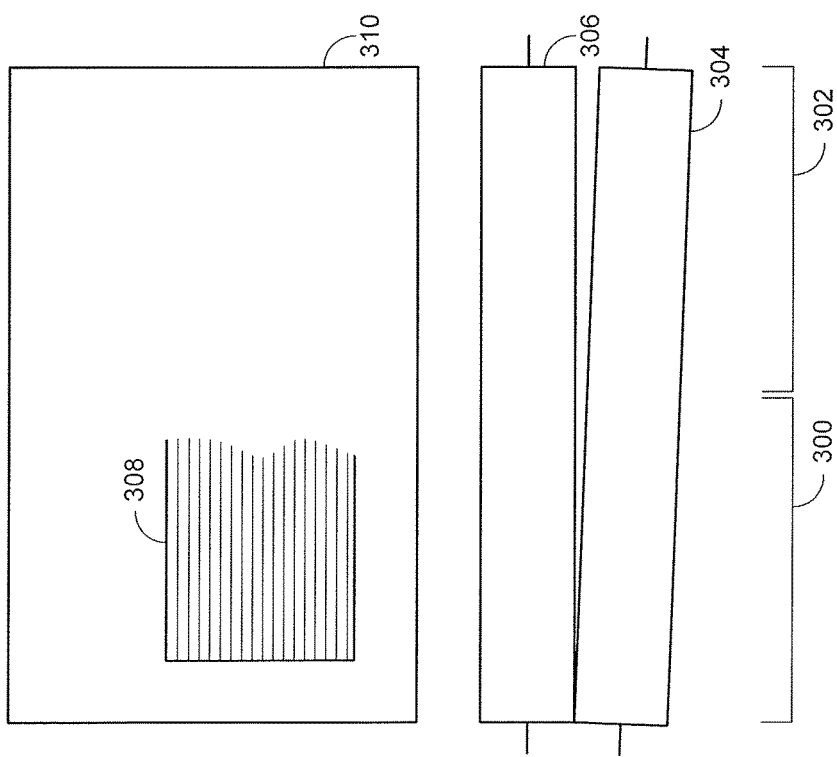
Figure 6C:
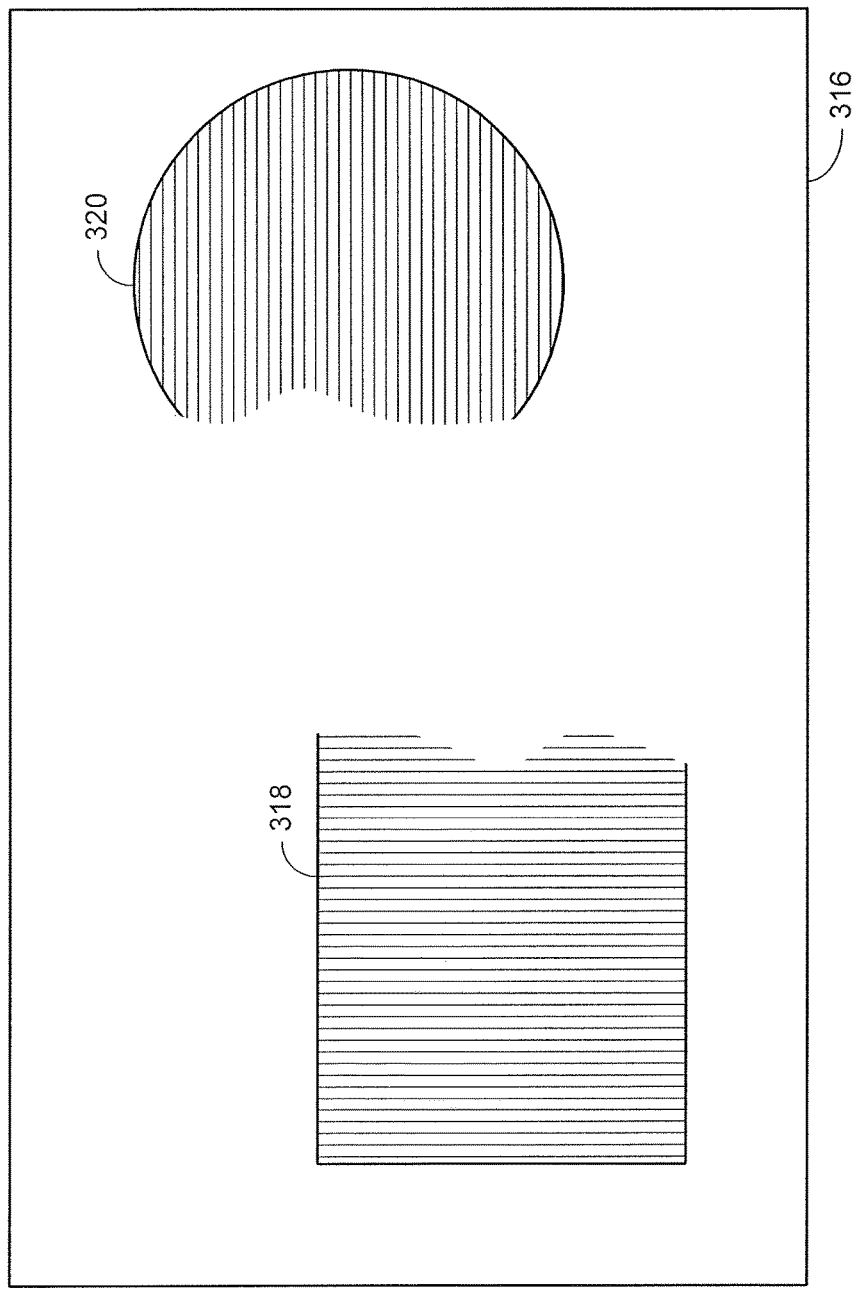

As the overlap between the design features of each selected pair of reference color images increases, the first value decreases. As the above mentioned dot product decreases (i.e., the angle between the vectors approaches ninety degrees), the second value decreases. The overlap between the design features in the reference color images determined by determining the number common pixel locations, which corresponds to a design feature to be printed, in the reference color images. The images may be dilated prior to the determining the overlap to allow for the miss-registration between the printing stations. The cost function is a weighted sum of the above spatial and chromatic values. The N-1 pairs of printing stations, are selected to form the minimum spanning tree (i.e., in terms of the cost function) in a connected weighted graph, where each station is a node in the graph. In other words, the N-1 printing stations, which the corresponding color images thereof exhibit substantial overlap in the design features, and the color vector dot product is small are selected Following is a description of the spatial separation registration. Reference is now made to FIGS. 6A-6C, which are schematic illustrations of the stages of the spatial separation registration of two un-registered printing stations printing the respective color images thereof, in accordance with another embodiment of the disclosed technique and referring to FIG. 3. In FIGS. 6A and 6B, side 300 is defined as the driver side of the web and side 302 is defined as the operator side of the web. FIG. 6A, depicts a plate roller 304, corresponding to printing stations $162_1$, $162_2$, $162_3$ and $162_4$ printing a first color image of the multi-color image to be printed. Processor 152 instructed actuator interface 156 to position plate roller 304 at an angle with respect to an impression roller 306, such that driver side 300 of plate roller 304 is in contact with the web, while operator side 302 of plate roller 304 is not in contact with the web. Consequently, only a portion of rectangle 308 is printed on the common area 310 of the web. The color of this first color image is represented by horizontal lines.

FIG. 6B, depicts a plate roller 312, corresponding to another one of printing stations $162_1$, $162_2$, $162_3$ and $162_4$ printing a second color image of the multi-color image to be printed. Processor 152 instructed actuator interface 156 to position plate roller 312 at an angle with respect to impression roller 306, such that operator side 302 of plate roller 312 is in contact with the web, while driver side 300 of plate roller 312 is not in contact with the web. Consequently, only a portion of circle 314 is printed on the common area 310 of the web. The color of this second color image is represented by vertical lines.

With reference to FIG. 6C, once the portion of the first color image and the portion of the second color image are printed on the common area 310 on the web, imager 154 acquires an image 316 of the common area. Image 316 includes a representation 318 of the portion of rectangle 308 on the driver side thereof and a representation 319 of the portion of circle 314 of the operator side thereof. Processor 152 registers the driver side of image 316 with layer of reference image 160, stored in memory 158, corresponding to the first color image. Processor 152 further registers the operator side of image 316 with the layer of reference image 160 corresponding to the second color image. Consequently, the two colors images, and consequently the respective printing stations thereof, are registered one with respect to the other. Once processor 152 registers the operator side and the driver side of image 316, processor 152 instructs actuator interface 156 to move the rollers of at least one of the respective ones of printing stations $162_1$, $162_2$, $162_3$ and $162_4$ to the registered locations thereof.

Figure 7:
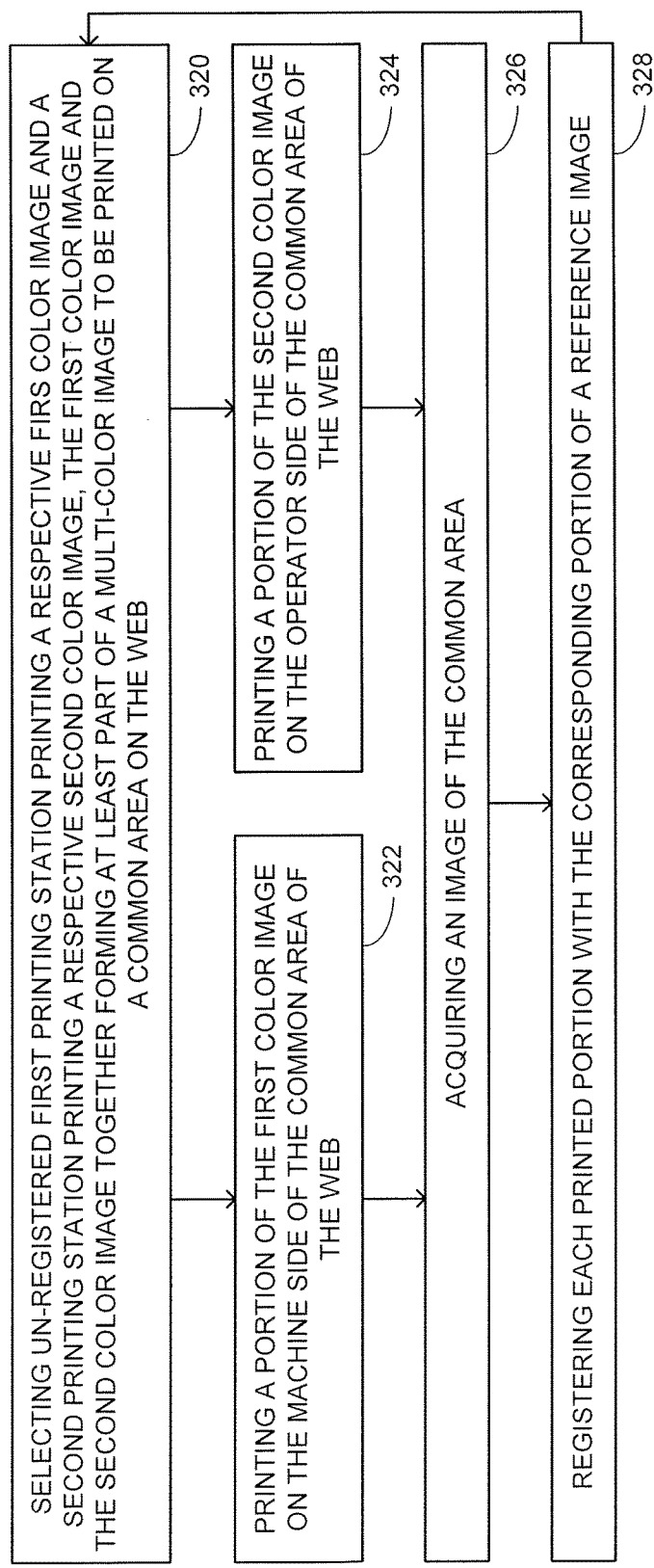
FIG. 7 is a schematic illustration of a method for registering the printing stations of a printing press without the use of registration marks or targets, operative in accordance with a further embodiment of the disclosed technique.

Reference is now made to FIG. 7, which is a schematic illustration of a method for registering the printing stations of a printing press without the use of registration marks or targets, operative in accordance with a further embodiment of the disclosed technique. In procedure 320, un-registered first printing station printing a respective first color image and a second printing station printing a respective second color image are selected. The first color image and the second color image together forming at least part of a multi-color image to be printed on a common area on the web. With reference to FIG. 3, processor 152 selects an un-registered first printing station printing a respective first color image and second printing station printing a respective second color image.

In procedure 322, a portion of the first color image is printed on the driver side of the common area. Printing a portion of the first color image on the driver side of the common area is achieved by positioning the plate roller at an angle with respect to the impression roller. With reference to FIGS. 3 and 6A, processor 152 instructed actuator interface 156 to position plate roller 304 at an angle with respect to an impression roller 306, such that driver side 300 of plate roller 304 is in contact with the web, while operator side 302 of plate roller 304 is not in contact with the web.

In procedure 324, a portion of the second color image is printed on the operator side of the common area of the web. Printing a portion of the second color image on the operator side of the common area is achieved by positioning the plate roller at an angle with respect to the impression roller. With reference to FIGS. 3 and 6B, processor 152 instructed actuator interface 156 to position plate roller 312 at an angle with respect to impression roller 306, such that operator side 302 of plate roller 312 is in contact with the web, while driver side 300 of plate roller 312 is not in contact with the web.

In procedure 326, an image of the common area is acquired. The acquired image includes representation of the printed portions of each color image. One side of the acquired image includes a representation of the portion of the color image printed on the driver side of the web. The other side of the acquired image includes a representation of the portion of the color image printed on the operator side of the web. With reference to FIGS. 3 and 6C, imager 154 acquires an image 316 of the common area. Image 316 includes a representation 318 of the portion of rectangle 308 on the driver side thereof and a representation 320 of the portion of circle 314 of the operator side there.

In procedure 328, each representation of the printed portions of each color image in the acquired image is registered with the respective layer of a reference image corresponding to the color respective of that representation. The driver side of the acquired image is registered with the layer of the reference image corresponding to the first selected color image. The operator side of the acquired image is registered with the layer of the reference image corresponding to the second selected color image. Consequently, the two colors are registered one with respect to the other. With reference to FIG. 3, processor 152 registers the driver side of image 316 with layer of reference image 160, stored in memory 158, corresponding to the first color image. Processor 152 further registers the operator side of image 316 with the layer of reference image 160 corresponding to the second color image.

According to another embodiment of the disclosed technique, chromatic separation and spatial separation are employed simultaneously to register four different printing stations (i.e., simultaneously). Accordingly, two printing stations print portions of the respective color images thereof on the driver side of the common area on web and two different printing stations print portions the respective color images thereof on the operator side of common area on the web. An imager acquires an image of the common area. The representations of the portions printed on the driver side of the web are chromatically separated as described above. The representations of the portions printed on the operator side of the web are also chromatically separated as described above. Thus, four monochrome images are produced. These monochrome images are then registered with respect to a reference image and thus with respect to each other. Accordingly, the respective printing stations are also registered.

Figure 8:
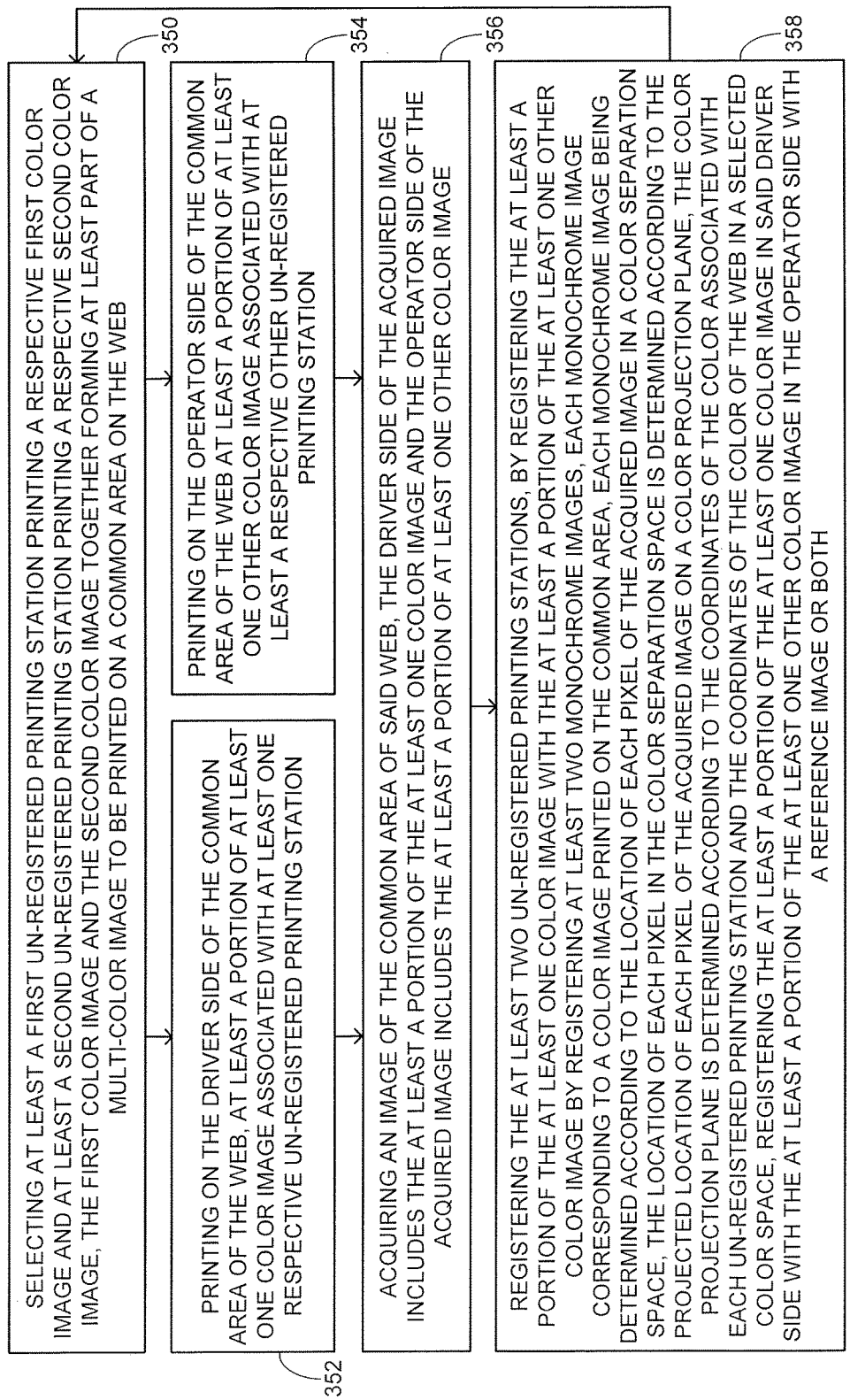
FIG. 8 is a schematic illustration of a further embodiment of a method for registering the printing stations of a printing press without the use of registration marks or targets.

Reference is now made to FIG. 8, which is a schematic illustration of a method for registering the printing stations of a printing press without the use of registration marks or targets, operative in accordance with another embodiment of the disclosed technique. In procedure 350, at least a first un-registered printing station printing and a second un-registered printing stations are selected. The first un-registered prints station printing a respective first color image and the second un-registered printing station prints a respective second color image. The first color image and the second color image together forming at least part of a multi-color image to be printed on a common area on the web. With reference to FIG. 3, processor 152 selects at least two un-registered printing stations In procedure 352, at least a portion of at least one color image associated with at least one respective un-registered printing station is printed on the driver side of the common area of the web. With reference to FIG. 3, one of printing stations 162₁, 162₂, 162₃ and 162₄ being a selected un-registered printing station prints, at least a portion of at least the color image associated therewith on the driver side of the common area of the web.

In procedure 354, at least a portion of at least one other color image associated with at least a respective other un-registered printing station is printed on the operator side of the common area of the web. With reference to FIG. 3, one of printing stations 162₁, 162₂, 162₃ and 162₄ being a selected un-registered printing station prints, at least a portion of at least the color image associated therewith on the operator side of the common area of the web.

In procedure 356, an image of the common area of the web is acquired. The driver side of the acquired image includes the at least a portion of the at least one color image and the operator side of the acquired image includes the at least a portion of at least one other color image In procedure 358, the at least two un-registered printing stations are registering by registering the at least a portion of the at least one color image with the at least a portion of the at least one other color image according either one of the following or both:

registering at least two monochrome images. Each monochrome image corresponding to a color image printed on the common area. Each monochrome image being determined according to the location of each pixel of the acquired image in a color separation space. The location of each pixel in the color separation space is determined according to the projected location of each pixel of the acquired image on a color projection plane. The color projection plane is determined according to the coordinates of the color associated with each un-registered printing station and the coordinates of the color of the web in a selected color space.

registering the at least a portion of the at least one color image in the driver side with the at least a portion of the at least one other color image in the operator side with a reference image or both.

With reference to FIG. 3, processor 152 registers the at least two un-registered printing stations.

As mentioned above, the monochrome images are registered either one with respect to the other or with respect to a reference image. In general, when registering two images, one image is defined as the 'source image' and the other image is defined as the 'target image'. Registration is achieved by two stages, the feature matching stage and the image transformation matching stage. Feature matching may be performed by identifying features in the source image and searching for corresponding features in the target image (e.g., by employing correlation). Alternatively, both images are divided into tiles and for each tile in the source image, searching for a corresponding tile in the target image.

Once features in the source image are matched with corresponding features in the target image, translation matching may be performed by determining a transformation matrix. The parameters of the transformation matrix are the parameters that minimize the sum of square distances between the locations (i.e., the coordinates in the image) of the pixels of the features in the source image and the corresponding features in the target image transformed into the source image. When only translation and rotation are of interest, the transformation matrix may be of the following form:

$$\begin{bmatrix} x_1 \\ y_1 \end{bmatrix} = \begin{bmatrix} \cos\alpha & -\sin\alpha & t_x \\ \sin\alpha & \cos\alpha & t_y \end{bmatrix} \begin{bmatrix} x_0 \\ y_0 \\ 1 \end{bmatrix} \quad (1)$$

where x0, y0 are location of a pixel in target image, x1, y1 the location of the corresponding pixel in the source image, α is the rotation angle tx and ty are the translation parameters.

When Translation, Rotation (e.g., caused by the miss-aligned printing plates), scale (i.e., different pixels size of the source image and the target image) and shear (e.g., when the imager is acquiring the image at an angle relative to the web), the transformation matrix may be of the following form:

$$\begin{bmatrix} x1 \\ y1 \end{bmatrix} \approx \begin{bmatrix} a & b & c \\ d & e & f \end{bmatrix} \begin{bmatrix} x0 \\ y0 \\ 1 \end{bmatrix} \quad (2)$$

where x0, y0 are location of a pixel in target image, x1, y1 the location of the corresponding pixel in the source image and a, b, c, d, e and f are matrix parameters.

As described above, a pair of printing stations can registered with each other by employing either the chromatic separation technique or the spatial separation technique. Two pairs of printing station may be registered with each other by employing both the spatial and chromatic separation techniques. However, according to a further embodiment of the disclosed technique, when the image to be printed includes at least two different regions, each including a respective different pair of at least partially overlapping color images of different colors, then two or more pairs of printing stations may be registered simultaneously by employing the above mentioned chromatic separation registration for each region and the spatial separation technique between regions (however, without tilting the rollers). Initially, at least two regions which include different pairs of at least partially overlapping color images of different colors are identified in a reference image. This reference image includes the different color images to be printed (e.g., layers in a PDF). Thereafter, these color images are printed on common area on the web to form a composite printed image (i.e., composed of the colors which were printed). An imager acquires an image of the common area of the web and the composite printed image thereon. The above mentioned regions are identified in the acquired image, and two monochrome images, corresponding to the color images printed by each printing station in each region, are determined by employing chromatic separation described hereinabove in conjunction with FIGS. 4A-4H and 5 for each region. The monochrome images of each region are registered one with the other by employing the reference image, thus registering each pair associated with each region. Thereafter, one monochrome image respective of one region is registered to a monochrome respective of another region by employing the reference image. Thus, the registration error between all the printing stations can be determined and a registration correction may be determined for each station. It is noted that registering the printing stations of a printing press by employing different regions, where each includes a respective different pair of at least partially overlapping color images it is required that within the identified regions, only two color images will be printed. To that end, requires initial coarse information regarding the displacement between the printing stations, as further explained below.

Figure 9A:
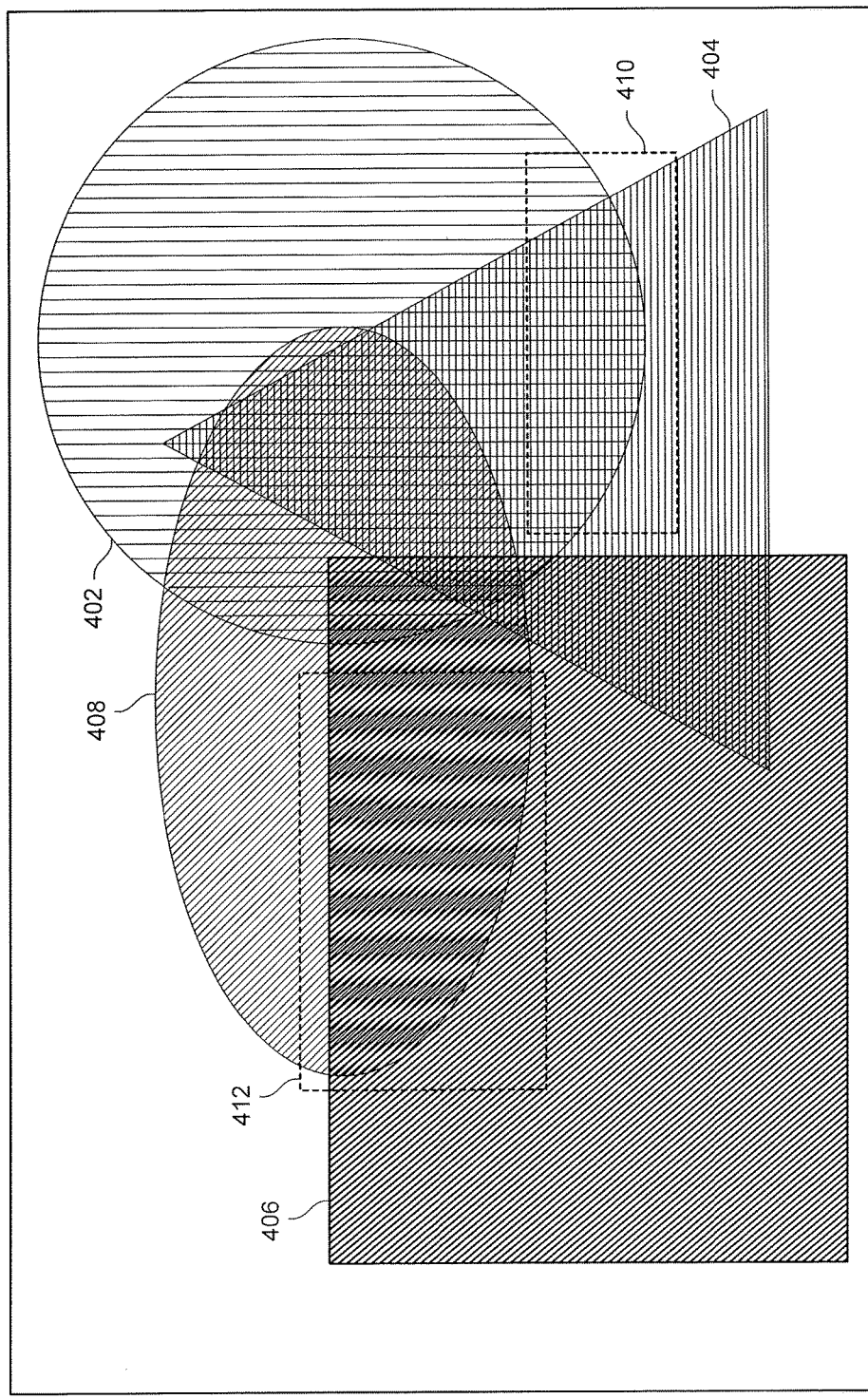
FIG. 9A is a schematic illustration of an exemplary reference image, which is to be printed on a web
Figure 9B:
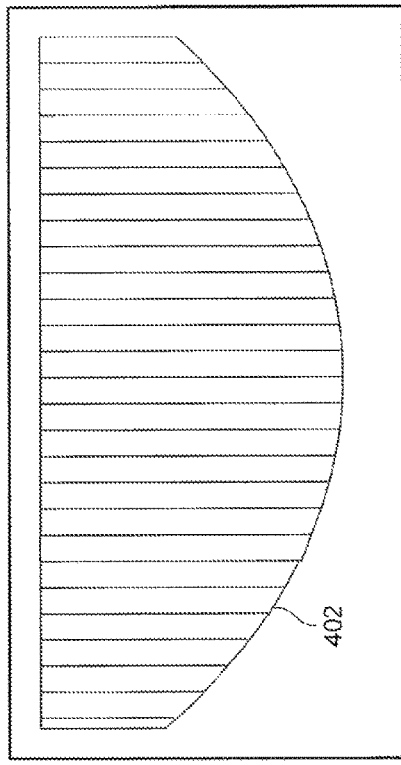
FIGS. 9B-9E are images of the different color images.
Figure 9D:
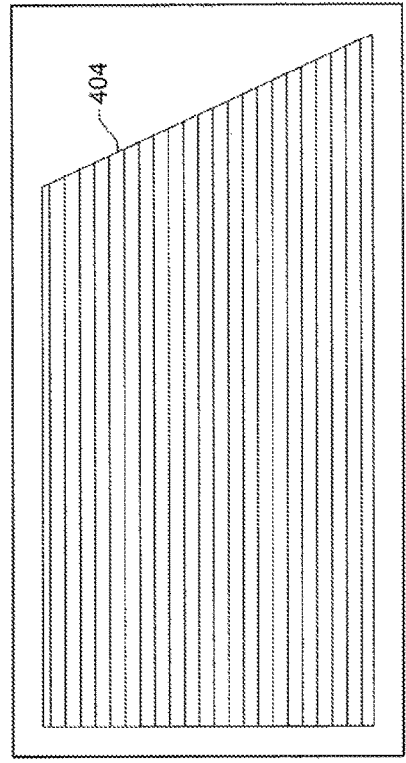
Figure 9C:
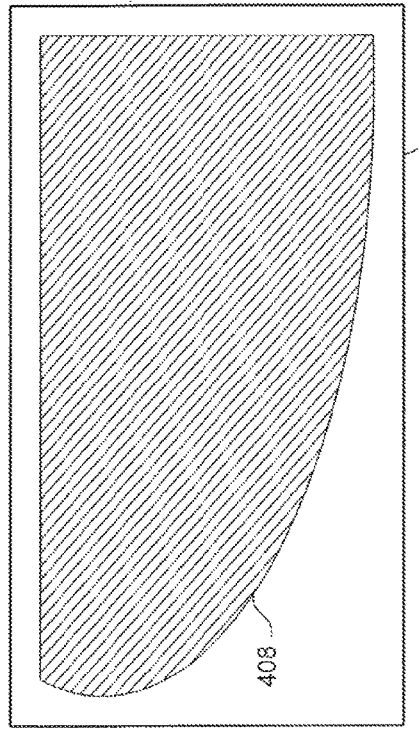
Figure 9E:
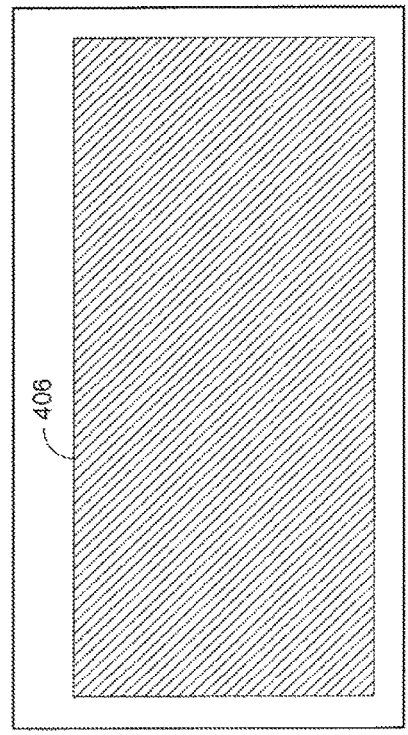

The explanation which follows, in conjunction with FIGS. 9A-9E and 10A-10E relates to an example of registering two pairs printing stations. However, more than two pairs of printing stations may be registered when more than two regions, each including different pairs of at least partially overlapping color images of different colors, are identifiable in the reference image (i.e., the image to be printed). Reference is now made to FIGS. 9A-9E. FIG. 9A is a schematic illustration of an exemplary reference image, generally referenced 400, which is to be printed on a web, in accordance with another embodiment of the disclosed technique. FIGS. 9B-9E are images of the different color images to be printed in each region also in accordance with a further embodiment of the disclosed technique. Image 400 includes four different shapes to be printed, a circle 402, a triangle 404, a rectangle 406 and an ellipse 408. In FIGS. 9A-9E, each one of circle 402, triangle 404, rectangle 406 and ellipse 408 is to be printed with a different respective color indicated by the respective hatched lines of circle 402, triangle 404, rectangle 406 and ellipse 408. With reference to FIG. 3, for example, printing station $162_1$ is to print circle 402, printing station $162_2$ is to print triangle 404, printing station $162_3$ is to print rectangle 406, printing station $162_4$ is to print ellipse 408. Accordingly, each one of circle 402, triangle 404, rectangle 406 and ellipse 408 is associated with a respective color image (e.g., a layer in the PDF file). Prior to printing, at least two different regions, region 410 and region 412, each including a respective different pair of overlapping color images of different colors are identified in reference image 400. In region 410, circle 402 and triangle 404 overlap. In region 412, rectangle 406 and ellipse 408 overlap. It is noted that it is sufficient that the pair of color images in each region exhibits a different color as further explained below. FIG. 9B depicts region 412 and the portion or ellipse 408 to which is to be printed on the web. FIG. 9C depicts region 412 and the portion or rectangle 406 which is to be printed on the web. FIG. 9D depicts region 410 and the portion or triangle 404 which is to be printed on the web. FIG. 9E depicts region 410 and the portion or circle 402 which is to be printed on the web.

Figure 10A:
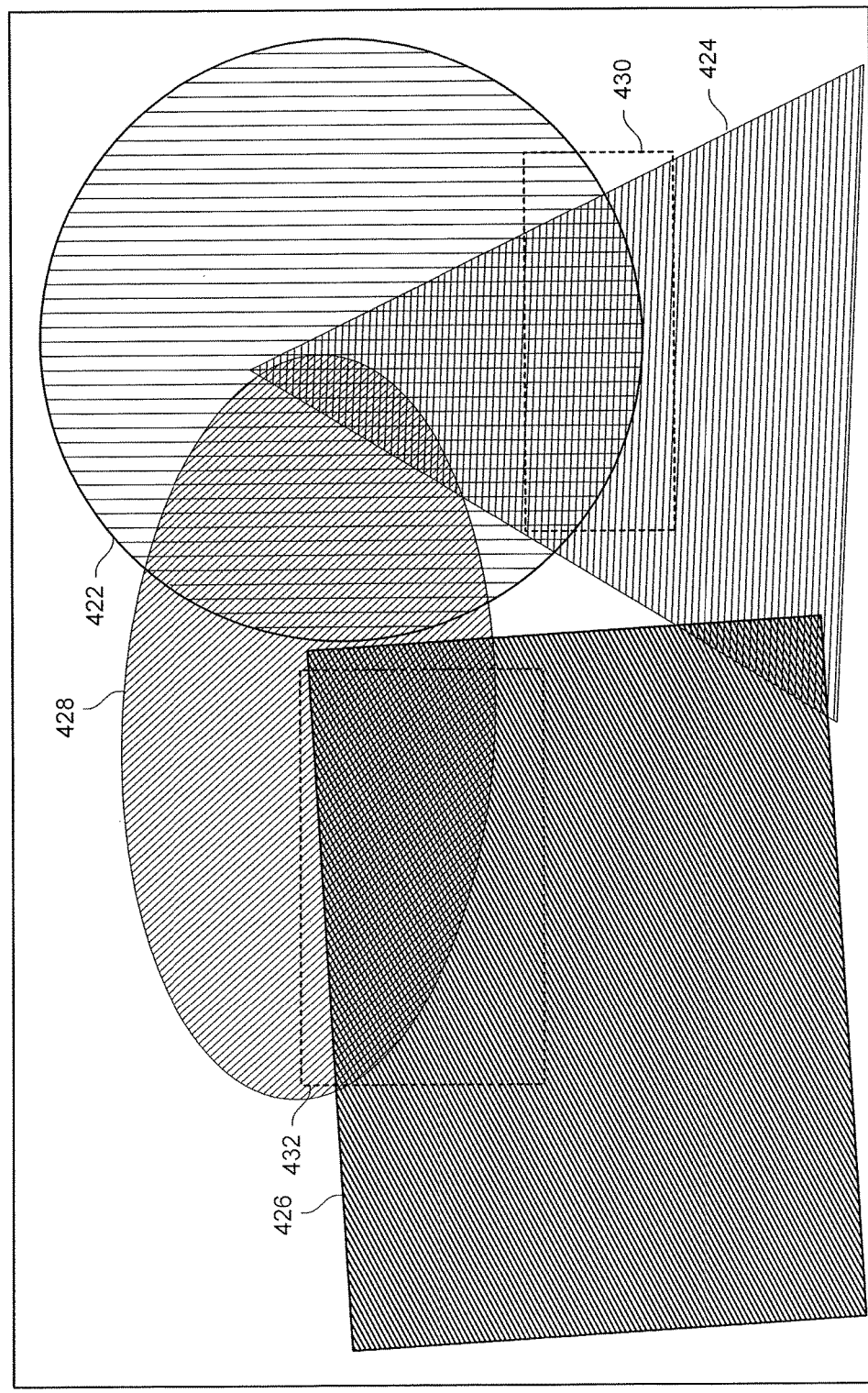
FIG. 10A is a schematic illustration of an exemplary acquired image, of the common area of the web, in accordance with a further embodiment of the disclosed technique

Reference is now made to FIGS. 10A-10E. FIG. 10A is a schematic illustration of an exemplary acquired image, generally referenced 420, of the common area of the web, in accordance with a further embodiment of the disclosed technique. FIGS. 10B-10E are images of the monochrome images determined from the acquired imager, also in accordance with a further embodiment of the disclosed technique. Image 420 includes a circle 422, a triangle 424, a rectangle 426 and an ellipse 428, which were printed on the web by respective printing stations and which correspond to circle 402, triangle 404, rectangle 406 and ellipse 408 of FIG. 9. With reference to FIG. 3, for example, printing station $162_1$ printed circle 422, printing station $162_2$ printed triangle 424, printing station $162_3$ printed rectangle 426, printing station $162_4$ printed ellipse 428. However, the printing stations are out of register. Thus, circle 422, triangle 424, rectangle 426 and ellipse 428 are out of registration one with respect to the other. To register the printing stations, a processor (e.g., processor 152—FIG. 3) chromatically separates the images at region 430 (i.e., which corresponds to region 410—FIG. 9A) to determine a pair of monochrome images and registers these monochrome images with each other by employing the reference image. Also, the processor chromatically separates the images at region 432 (i.e., which corresponds to region 412—FIG. 9A) to determine another pair of monochrome images and registers these monochrome images with each other by employing the reference image. Thereafter, one of the monochrome images from region 430 is registered with one of the monochrome images form region 432 also by employing the reference image.

Figure 10B:
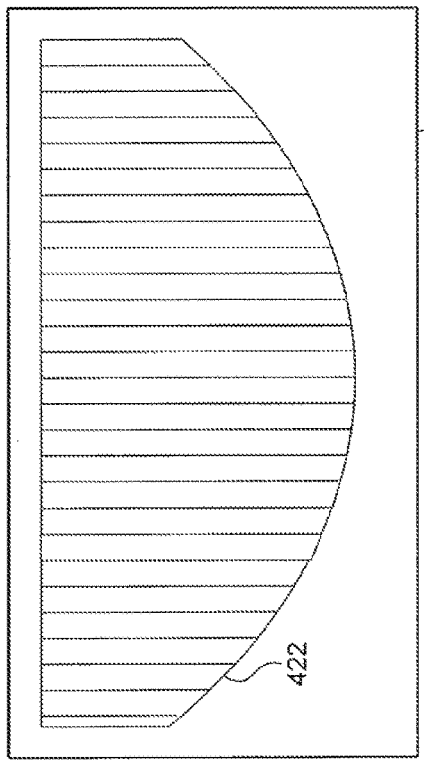
FIGS. 10B-10E are images of the monochrome images determined from the acquired imager.
Figure 10D:
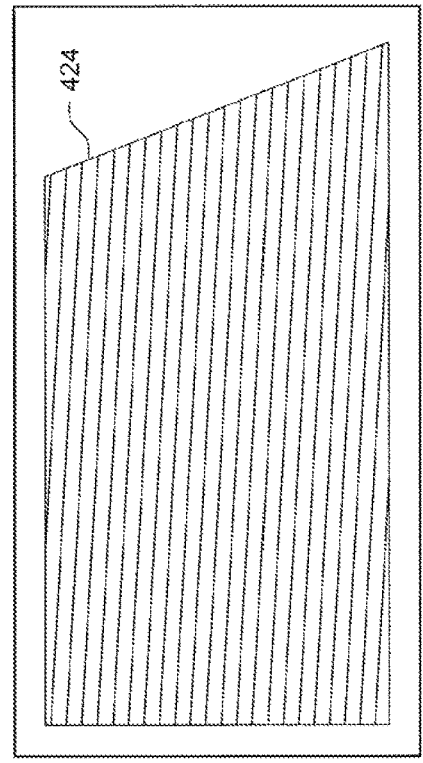
Figure 10C:
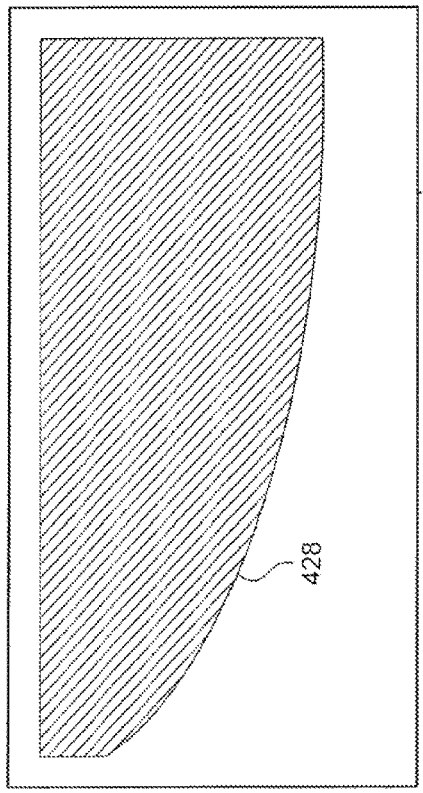
Figure 10E:
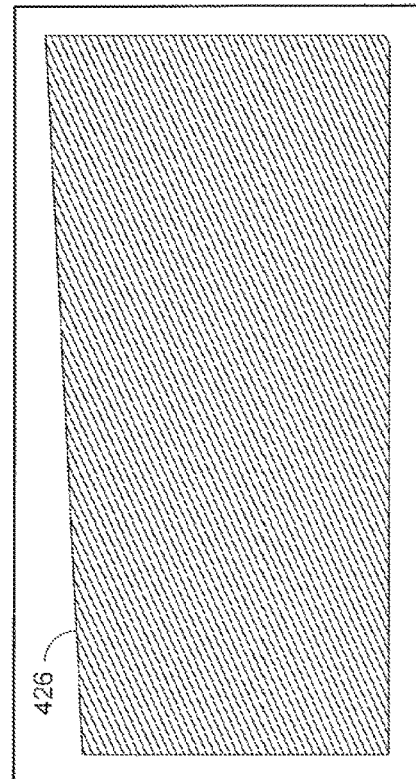

FIG. 10B depicts a monochrome image 440 of region 432 and the portion of ellipse 428 which was printed on the web, after being chromatically separated from rectangle 426. FIG. 10O depicts monochrome image 442 of region 432 and the portion or rectangle 426 which was printed on the web, after being chromatically separated from ellipse 428. FIG. 10D depicts monochrome image 444 of region 430 and the portion or circle 422 which was printed on the web, after being chromatically separated from triangle 424. FIG. 10E depicts monochrome image 446 of region 430 and the portion or triangle 424 which was printed on the web, after being chromatically separated from circle 422. As seen in FIGS. 10B-10E, printed portions of circle 422, triangle 424, rectangle 426 and ellipse 428 are out of register one with respect to the other relative to FIGS. 9B-9E.

According to the disclosed technique, the printing stations printing circle 422 and triangle 424 are registered with each other according to the respective monochrome images 444 and 446 thereof and by employing the reference image. Similarly, the printing stations printing rectangle 426 and ellipse 428 are also registered with each other according to the respective monochrome images 440 and 442 thereof and by employing the reference image. Thereafter, one of the monochrome images of each of region 432 (e.g., image 440—FIG. 10B) is registered with one of the monochrome images of region 430 (e.g., image 444—FIG. 10D) by employing the reference image, similar to the spatial separation technique described above. In other words, the spatial separation is logical (i.e., according to regions in the acquired reference images) rather than physical (i.e., by tilting the printing rollers).

Since the registration error is determined between the monochrome images 440 and 442, between monochrome images 444 and 446 and between monochrome images 440 and 444, the relative registration error between all four printing station is also determined. The relative registration errors between the printing station pairs (i.e., corresponding to monochrome images 440 and 442, monochrome images 444 and 446 and monochrome images 440 and 444), can be described as edges in a directed graph of a spanning-tree where the vertices are the printing stations. Such a spanning-tree provides the registration error between each printing station relative to a chosen 'root' station. After the registration error between the images is determined, a registration error correction is determined for each printing station accordingly and applied to each respective printing station. Once the registration error is determined processor 152 instructed actuator interface 156 to move the plate roller of each printing station (e.g., plate roller 304—FIG. 6A, plate roller 312—FIG. 6B) according to the determined registration error of the respective printing station.

As mentioned above, more than two pairs of printing stations may be registered when more than two regions, each including different pairs of at least partially overlapping color images of different colors, are identified on the reference image. However, two of the printing stations may print a different color image of the same color (i.e., the color images are different in the features being printed but the color of the features is the same). Reference is now made to FIG. 11, which is a schematic illustration of an exemplary reference image, generally referenced 480, which is to be printed on a web, in accordance with another embodiment of the disclosed technique. Image 480 includes three different shapes to be printed, a circle 482, a rectangle 404 and an ellipse 406. Circle 482 and rectangle 404 exhibit the same color (e.g., red) while ellipse 406 exhibit a different color (e.g., green) as indicated by the hatched lines thereof. Similar to as described above, prior to printing, at least two different regions, region 488 and region 490 are identified in image 480. Each one of region 488 and region 490 includes a respective different pair of overlapping color images of different colors. In region 488, circle 482 and ellipse 486 overlap. In region 490, rectangle 484 and ellipse 486 overlap. The registration error between the three printing stations corresponding to circle 482, rectangle 484 and ellipse 486 can be determined similar to as described above in conjunction with FIGS. 9A-9E and 10A-10E.

As mentioned above, the above described registration technique, which employs regions of overlapping pairs of color images, requires initial coarse information regarding the initial displacement between the printing stations (i.e., the "opening displacement conditions" between the printing stations). To determine such initial coarse information, each color image is printed separately on the web and an image thereof is acquired. The location of the printed object in the acquired image is determined and compared with the location of the respective color image of the printed object in the reference image. The displacement therebetween the acquired image and the respective color is then determined. Thereafter, the corresponding printing station is adjusted (i.e., displaced) to correct any discrepancies between the two locations. Alternatively, the corresponding color image is displaced within the reference image according to the determined coarse registration error. Such information is coarse since each acquired image of the printed color image is subjected to different acquisition conditions such as tension of the web, the tilt of the web, acquisition timing and the like.

Figure 12:
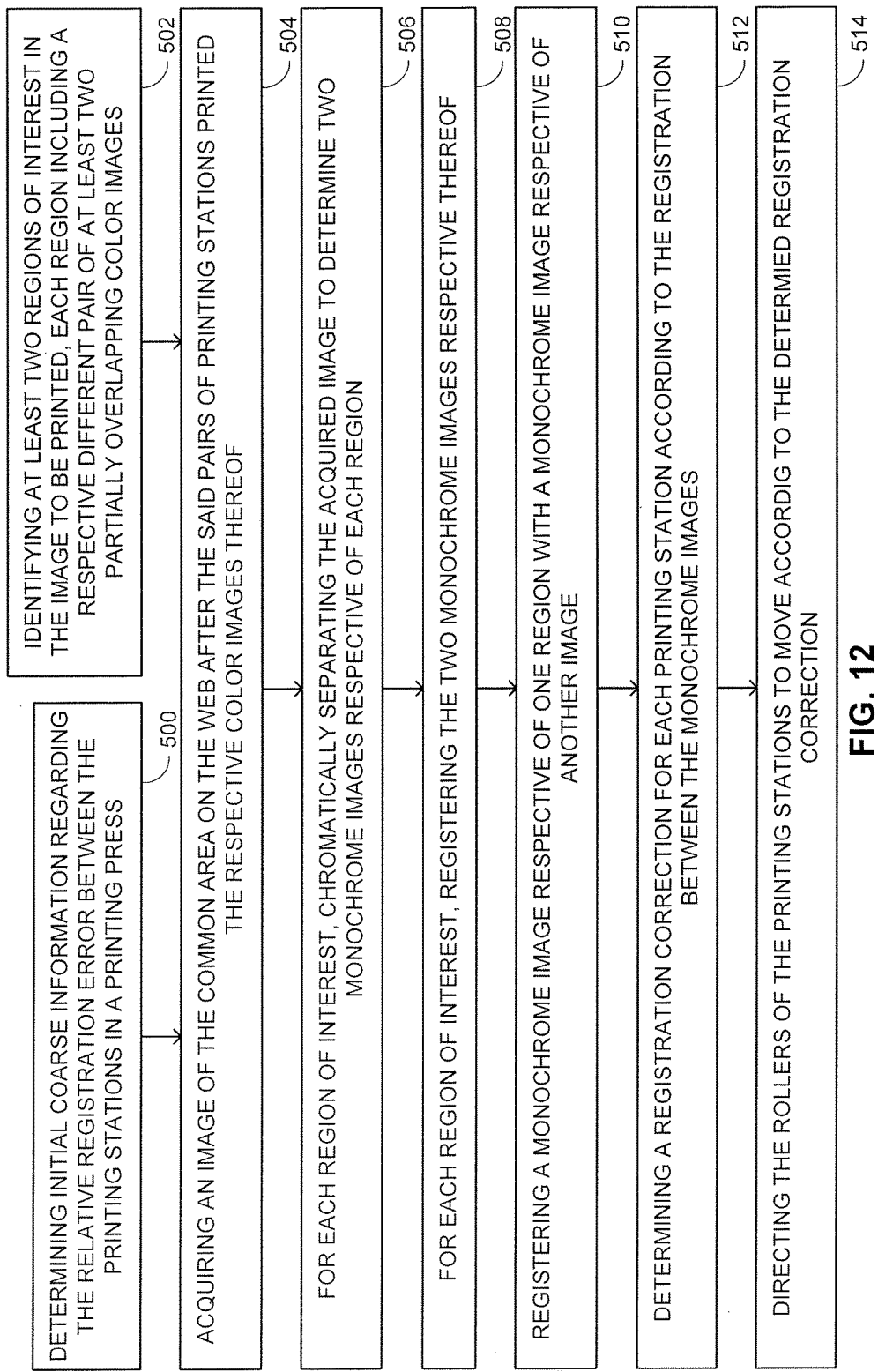
FIG. 12 is a schematic illustration of a method for registering at least two pairs of printing stations, operative in accordance with another embodiment of the disclosed technique.

Reference is now made to FIG. 12, which is a schematic illustration of a method for registering at least two pairs of printing stations, operative in accordance with another embodiment of the disclosed technique. In procedure 500, initial coarse information regarding the relative registration error between the printing stations is determined. Thereafter either the printing position of the printing station is adjusted (i.e., displaced) to correct any discrepancies between the two locations or the corresponding color image is displaced within the reference image according to the determined coarse registration error.

In procedure 502, at least two regions of interest are identified in the image to be printed. Each region includes a respective different pair of at least two partially overlapping color images of different colors. These regions of interest may be identified automatically or by a user via a user interface. With reference to FIG. 2, when the regions of interest are identified automatically, processor 152 determines at least two regions of interest.

In procedure 504, an image of the common area on the web is acquired after the said pairs of printing stations printed the respective color images thereof. With reference to FIG. 3, imager 154 acquires an image of the common area of the web after the pairs of printing stations $162_1$, $162_2$, $162_3$, $162_4$, printed the respective color images thereof.

In procedure 506, for each region of interest, the acquired image of that region is chromatically separated to determine two monochrome images respective of each region. In other words, each region of interest is associated with two respective monochrome images. With reference to FIG. 3, processor 152 chromatically separates the acquired image at each of the regions and determines two monochrome images respective of each region.

In procedure 508, for each region of interest, the two monochrome images respective thereof are registered. These two monochrome images are registered with each other by employing the reference image. With reference to FIG. 3, processor 152 registers the two monochrome images respective of each region of interest with the reference image and thus with each other.

In procedure 510, a monochrome image respective of one region is registered with a monochrome image respective of another image. These two monochrome images are registered with each other by employing the reference image. With reference to FIG. 3, processor 152 registers a monochrome image respective of one region with a monochrome image respective of another image.

In procedure 512, a registration correction is determined for each printing station according to the registration between the monochrome images. With reference to FIG. 3, processor 152 determines a registration correction for each printing according to the registration between the monochrome images.

In procedure 514, the rollers of the printing stations are directed to move to move according to the determined registration correction. With reference to FIG. 3, processor 152 instructed actuator interface 156 to move the rollers of each printing station according to the determined registration correction.

It will be appreciated by persons skilled in the art that the disclosed technique is not limited to what has been particularly shown and described hereinabove. Rather the scope of the disclosed technique is defined only by the claims, which follow.

The invention claimed is:

1. A method for registering a printing press using a selected color space, said printing press including a plurality of printing stations each for printing a respective color image on a web, each said printing stations being associated with a respective different color, at least two pairs of said printing stations being un-registered one with respect to the other, said method comprising the procedures of:

identifying at least two regions of interest in a reference image of the image to be printed, each region including only a respective different pair of two at least partially overlapping color images of different colors, each region corresponding to a respective pair of said at least two pairs of un-registered printing stations;

printing the color images corresponding to said at least two pairs of printing stations on a common area on said web;

acquiring an image of the printed common area on said web after the said pairs of printing stations have printed the respective color images thereof, said image being acquired in said selected color space, each pixel in the acquired image exhibiting a respective color associated with a respective location in said selected color space, primary colors of said selected color space being different from the respective colors of said printing stations;

for each region of interest, chromatically separating the acquired image in said selected color space to determine two monochrome images respective of said each region of interest;

for said each region of interest, registering the two monochrome images respective thereof;

registering a monochrome image respective of one region with a monochrome image respective of another region of interest;

determining a registration correction for each printing station according to the registration between the monochrome images; and directing rollers of each printing station to move according to said determined registration correction.

2. The method according to claim 1, further including a preliminary procedure of determining initial coarse information regarding a relative registration error between the printing stations.

3. The method according to claim 2, wherein a printing position of each of the printing stations is adjusted to correct discrepancies between respective locations of the respective color image in the reference image and in the acquired image.

4. The method according to claim 2, wherein the corresponding color image is displaced within the reference image according to the determined initial coarse information regarding the relative registration error.

5. The method according to claim 1, wherein said registering two monochrome images includes the sub-procedures of:

determining color coordinates of a background, and color coordinates of each of the colors associated with said un-registered printing stations in said selected color space;

determining a color projection plane in said selected color space, said color projection plane defined by coordinates of said web and coordinates of each of said colors associated with said un-registered printing stations, in said selected color space;

determining color coordinates of each pixel in the acquired image in said selected color space;

projecting said location of each pixel of the acquired image onto said color projection plane, thereby defining projected pixels; and transforming said color projection plane is into a two-dimensional color separation space, each axis in the two-dimension color separation space representing a respective one of said colors, thereby associating each projected pixel with respective coordinates in said two-dimensional color separation space;

determining said two monochrome images, each said monochrome image determined according to a coordinate value of each pixel corresponding to one of said colors to be printed.

6. The method according to claim 1, wherein said printing press is registered by registering N-1 pairs of printing stations, and wherein N is the number of printing stations in said printing press.

7. A system for registering a printing press by using a selected color space, said printing press including a plurality of printing stations each for printing a respective color image on a web, each of said printing stations being associated with a respective different color, at least two pairs of said printing stations being un-registered, said system comprising:

an imager configured to acquire an image of a printed common area of said web, said printed common area including a color image corresponding to said at least two pairs of said printing stations, said imager configured to acquire said image in said selected color space, each pixel in the acquired image exhibiting a respective color associated with a respective location in said selected color space, primary colors of said selected color space being different from the respective colors of said printing stations;

a processor, coupled with said imager, for each region of interest, said processor configured to chromatically separate the acquired image in said selected color space to determine two monochrome images respective of each region of interest and to register the two monochrome images respective thereof, said processor further configured to register a monochrome image respective of one region with a monochrome image respective of another region of interest, said processor also configured to determine a registration correction for each printing station according to the registration between the monochrome images, said processor configured to instruct an actuator interface to move rollers of each printing station according to the determined registration error of the respective printing station;

wherein, for at least two regions of interest identified in a reference image of the image to be printed, each region includes a respective different pair of two at least partially overlapping color images of different colors, each region corresponding to a respective pair of said at least two pairs of un-registered printing stations.

8. The system according to claim 7, wherein said processor is configured to determine initial coarse information regarding the relative registration error between the printing stations.

9. The system according to claim 8, wherein said processor is configured to instruct an actuator interface to adjust a printing position of the printing stations to correct discrepancies between respective locations of the respective color images in the reference image and in the acquired image.

10. The system according to claim 8, wherein said processor is configured to displace the corresponding color image within the reference image according to the determined initial coarse information regarding the relative registration error.

11. The system according to claim 7, wherein said processor is configured to register said two monochrome images by:

determining color coordinates of the background and color coordinates of each of the colors associated with said un-registered printing stations in said selected color space;

determining a color projection plane in said selected color space, said color projection plane defined by coordinates of said web and coordinates of each of said colors associated with said un-registered printing stations, in said selected color space;

determining color coordinates of each pixel in the acquired image in said selected color space;

projecting said location of each pixel of the acquired image onto said color projection plane, thereby defining projected pixels;

transforming said color projection plane is into a two-dimensional color separation space, each axis in the two-dimension color separation space representing a respective one of said colors, thereby associating each projected pixel with respective coordinates in said two-dimensional color separation space;

determining said two monochrome images, each said monochrome image determined according to a coordinate value of each pixel corresponding to one of said colors to be printed.

12. The system according to claim 11, wherein said printing press is configured to be registered by registering N-1 pairs of printing stations, and wherein N is a number of printing stations in said printing press.

* * * * *